United States Patent [19]
Moorehead et al.

[11] 4,027,108
[45] May 31, 1977

[54] MODULAR REGISTER AND SENDER ARRANGEMENT

[75] Inventors: Thomas J. Moorehead; John A. Gauthier, both of Brockville, Canada

[73] Assignee: GTE Automatic Electric (Canada) Limited, Brockville, Canada

[22] Filed: Feb. 26, 1976

[21] Appl. No.: 661,432

Related U.S. Application Data

[63] Continuation of Ser. No. 510,081, Sept. 27, 1974, Pat. No. 3,941,937.

[52] U.S. Cl. .......................... 179/18 EB; 179/18 ES
[51] Int. Cl.² ........................................... H04Q 3/54
[58] Field of Search ................ 179/18 ES, 18 EB

[56] References Cited

UNITED STATES PATENTS

| | | | |
|---|---|---|---|
| 3,727,008 | 4/1973 | Dodson | 179/18 ES |
| 3,767,863 | 10/1973 | Borbas et al. | 179/18 ES |
| 3,812,297 | 5/1974 | Borbas | 179/18 ES |

Primary Examiner—Thomas W. Brown
Attorney, Agent, or Firm—David W. Heid

[57] ABSTRACT

A register and sender module with an internal common control provided with common addressing, storage, and timing for up to four registers, up to two senders, and up to two tone control circuits in a module. Modular construction allows addition and replacement of the various circuits in the module on an as required basis with a minimum of rewiring. An internal bus couples all module circuits to the internal common control. Each register and sender in the module is accessible from every inlet to the module. Provision is made for single digit storage to the registers and senders and single digit read out from the sender.

9 Claims, 28 Drawing Figures

MODULAR REGISTER AND SENDER ARRANGEMENT

This is a continuation of application Ser. No. 510,081, filed Sept. 27, 1974, now U.S. Pat. No. 3,941,937.

BACKGROUND OF THE INVENTION

1. Field of the Invention

The invention relates to an improved register and sender arrangement for a telephone communication switching system, and more particularly to an arrangement of four registers and two senders in a singel module which allows a sharing of certain functions such as digit storage, clock circuits, and address decoding.

2. Description of the Prior Art

The invention was developed for the system shown in U.S. Pat. No. 3,767,863, issued Aug. 23, 1973, by Borbas et al. for a Communication Switching System with Modular Organization and Bus, hereinafter referred to as the System S2 patent. A bus control arrangement including bus interface units is shown in U.S. Pat. No. 3,812,297, issued May 21, 1974, by Borbas for a Bus Control Arrangement for a Communication Switching System, hereinafter referred to as the BCU patent.

A previous system is described in U.S. Pat. No. 3,487,173, issued Dec. 30, 1969, by Duthie et al. for a Small Exchange Stored Program Switching System, hereinafter referred to as the System S1 patent. The register and sender arrangement of the S1 System is disclosed in U.S. Pat. No. 3,749,844, issued July 31, 1973, By Dufton for a Stored Program Small Exchange with Registers and Senders.

The S1 System register and sender arrangement was designed with each register and sender having its own storage facilities and therefore requiring separate addressing and access circuitry for each of the registers and senders. Other previous crossbar systems have also been arranged in a similar manner, however for the System S2 and future developments it was felt that flexibility and ease of expansion was a necessity. By providing an internal bus structure and progress word it was then possible to develop a system with increased flexibility which was also more economical. Registers and senders could be added by plugging in on an as required basis and different types of registers and senders could be utilized in a system.

SUMMARY OF THE INVENTION

According to the invention, a common control section is provided with an address buffer, storage devices, and clocks to drive various register and sender combinations which are coupled to the common control by an internal bus. This configuration allows up to four registers, two senders, and two tone control circuits to be driven by a single common control. The tone control circuits are only provided when a TCMF or MF register is used. This arrangement also allows the registers and senders to be replaced by different types of registers and senders with an absolute minimum or rewiring.

A first object of the invention is to provide a flexible register and sender arrangement.

A second object of the invention is to provide a register and sender arrangement which may be easily expanded.

A third object of the invention is to provide decoding for all registers and senders in a common control.

A fourth object of the invention is to provide storage for all registers and senders in a common control.

A fifth object of the invention is to provide clocks for all registers and senders in a common control.

A sixth object of the invention is to provide an internal bus to couple a common control to all registers, senders, and common control circuits.

A seventh-object of the invention is to provide an arrangement of registers and senders with a common control while still maintaining full availability to each register and sender from every inlet to the arrangement.

An eighth object of the invention is to provide single digit storage for a register and sender arrangement.

A ninth and final object of the invention is to provide single digit reading for a sender.

BRIEF DESCRIPTION OF THE DRAWINGS

The above-mentioned and other features and objects of this invention and the manner of obtaining them will become more apparent, and the invention itself will be best understood by reference to the following description of an embodiment of the invention taken in conjunction with the accompanying drawings, in which.

DESCRIPTION OF THE PREFERRED EMBODIMENT

Figure 1:
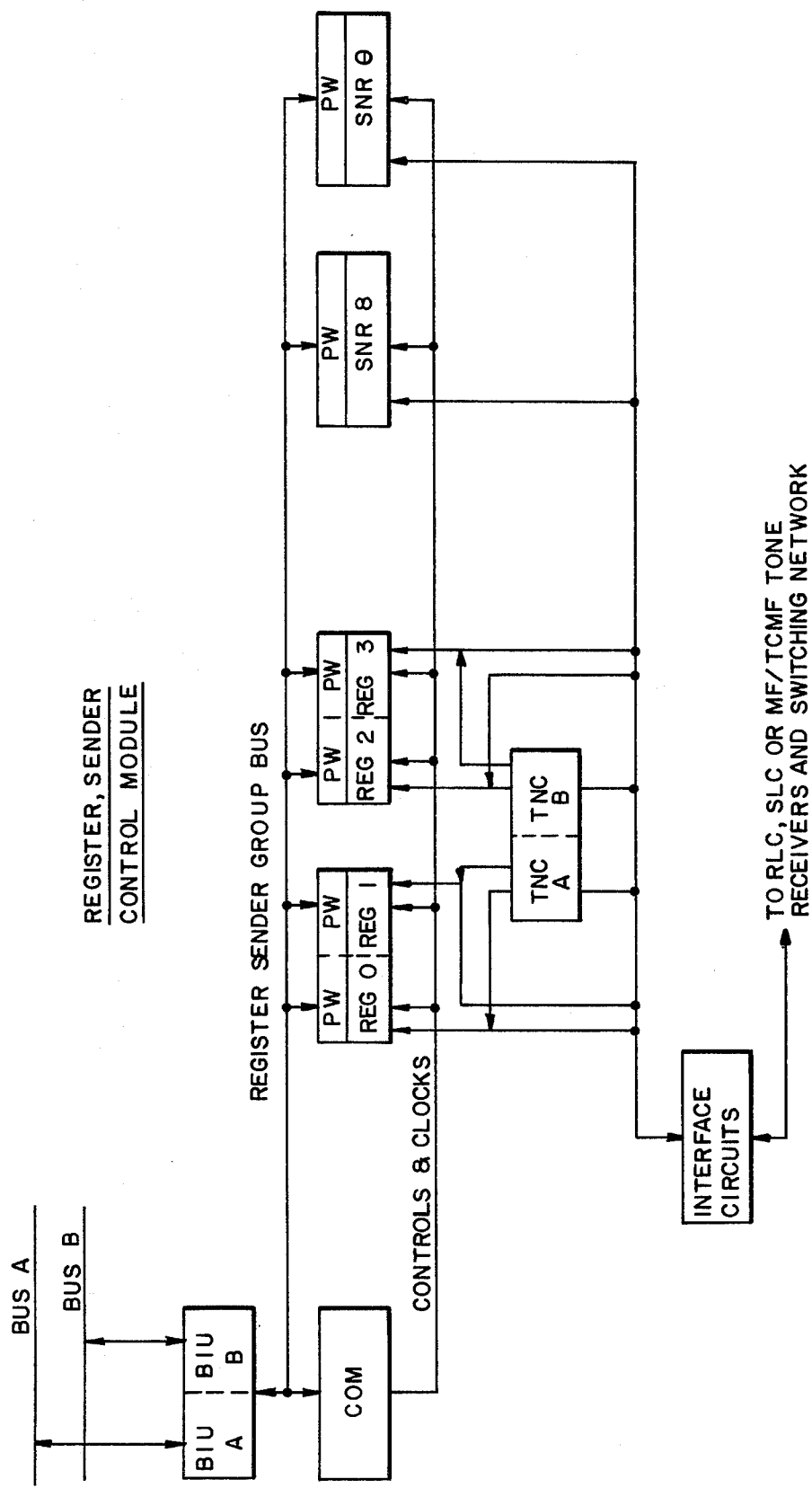
FIG. 1 is a general block diagram of the overall register and sender arrangement.

FIG. 1 shows the overall arrangement of the improved register and sender module, including inputs from the central processor from bus A or bus B through the bus interface units (BIU) to the common control (COM) and the registers (REG), senders (SNR), and tone control circuits (TNC). The progress word for each reigister and sender is designated PW. The connections to the switching network are shown generally through the interface circuits to the register line circuit (RLC), sender line circuit (SLC), or multifrequency (MF/TCMF) tone receivers and then to the switching network.

Figure 2A:
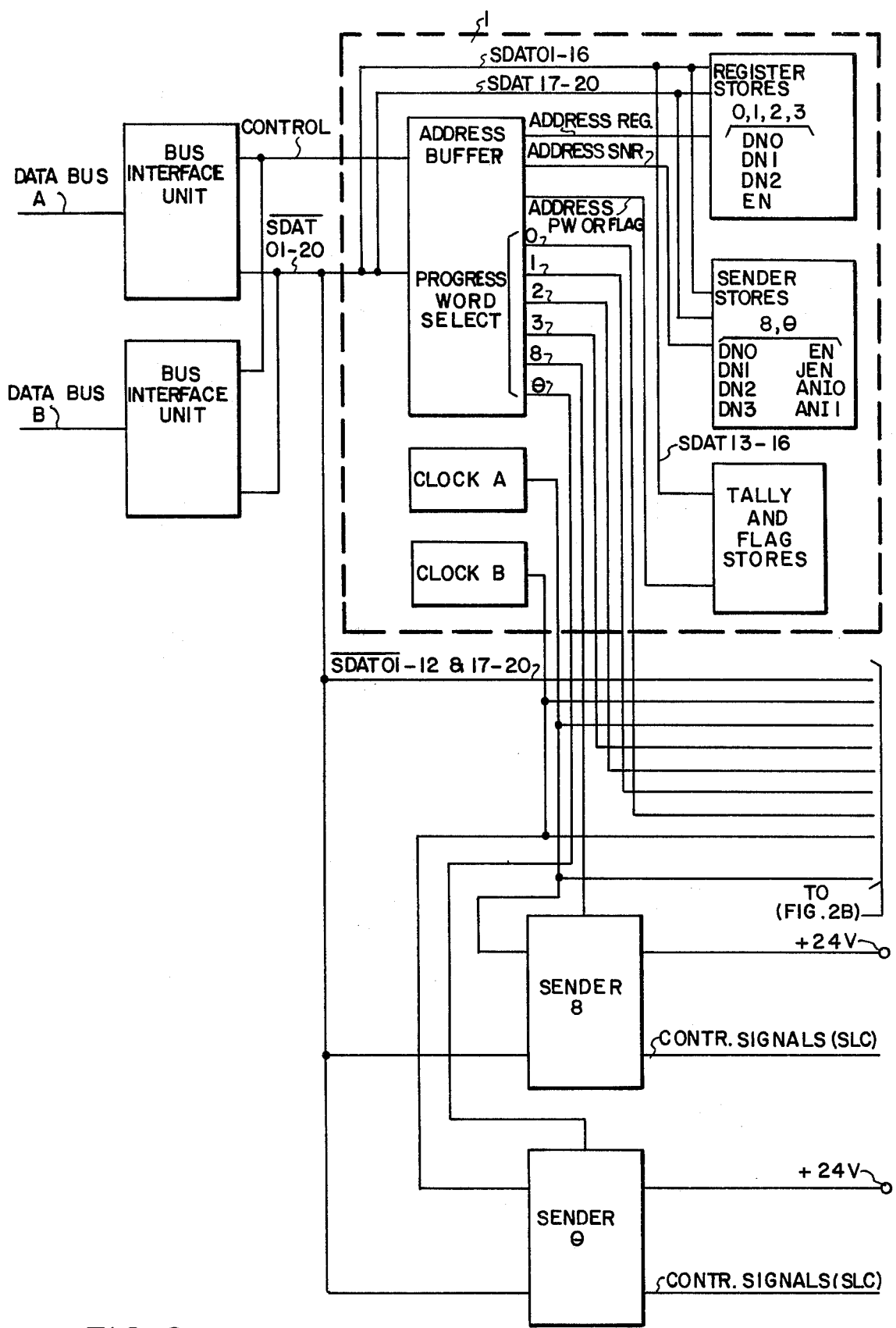
FIG. 2 (2A and 2B) is a more involved block diagram of the register and sender arrangement showing the major components of the common control and the system interconnections.
Figure 2B:
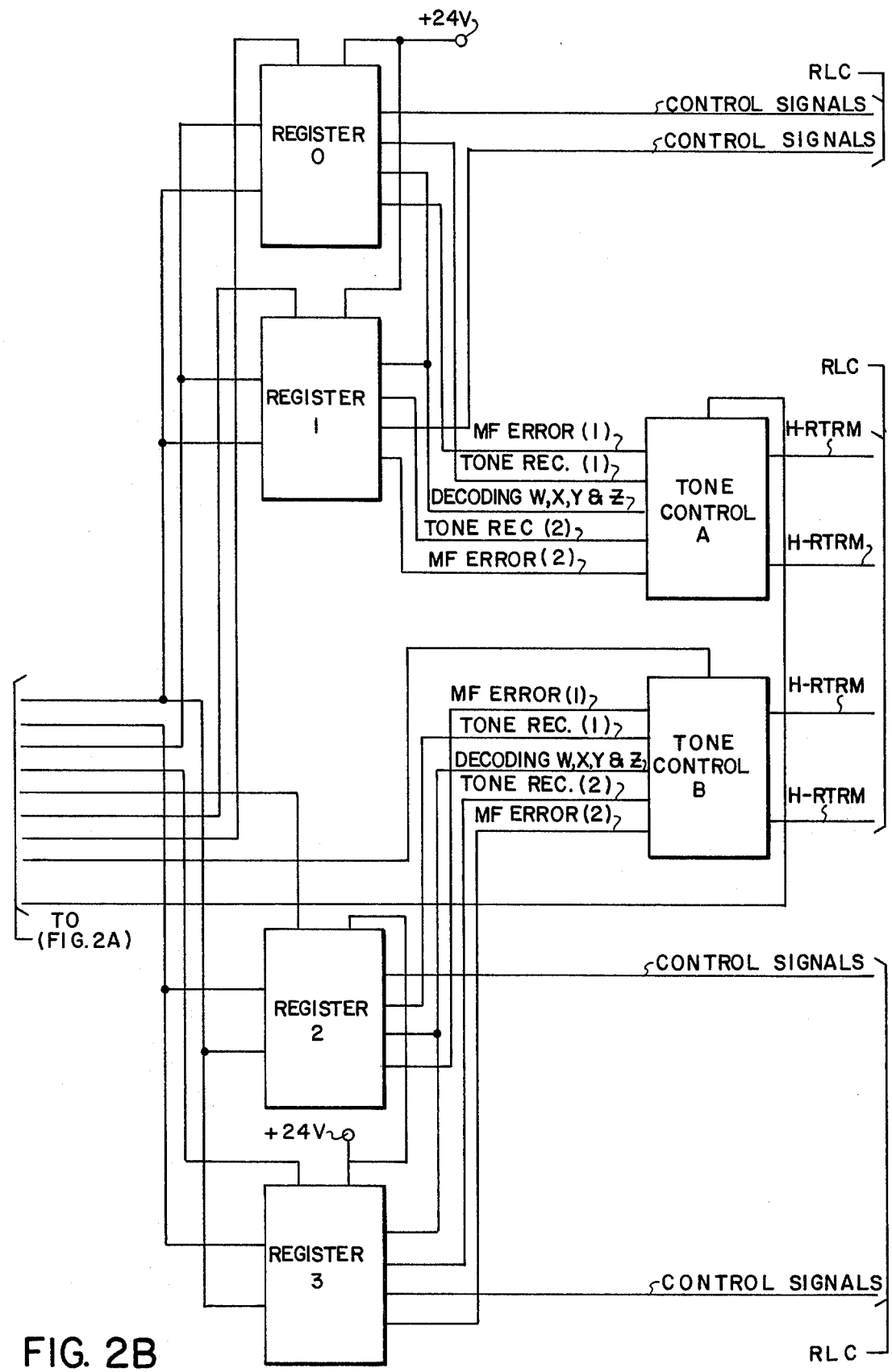

FIG. 2 shows a much more detailed block diagram including the contents of the common control 1. The 20 data bit lines for the progress word are shown as SDAT01-20. The inner connection of these bits on the internal bus and the bits used by the progress word select are also shown. The control signals from the sender line circuits (SLC) are shown coupled to the senders 8 and θ. Control signals from the register line circuit (RLC) are shown directly coupled to the registers 0-3 for dial pulsing (DP) signals, and the multifrequency signals MF or TCMF are shown coming from the associated MF or TCMF receivers via the RLC to the tone control circuits A or B. After decoding has been performed by TNC A or B, the signals are then sent to the particular registers assigned to each tone control circuit.

Figure 3A:
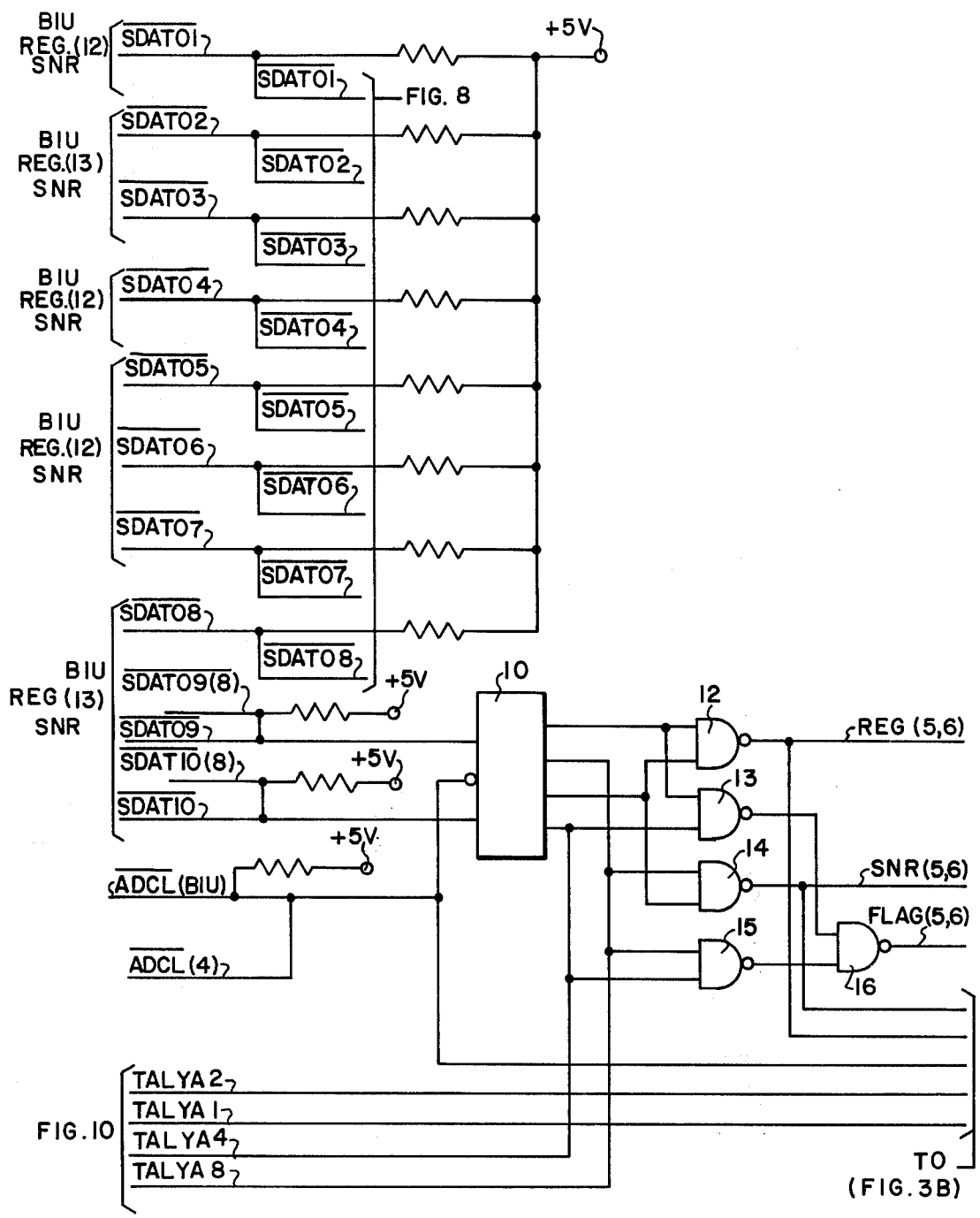
FIGS. 3 (3A and 3B) and 4 show the address latches of the common control.
Figure 3B:
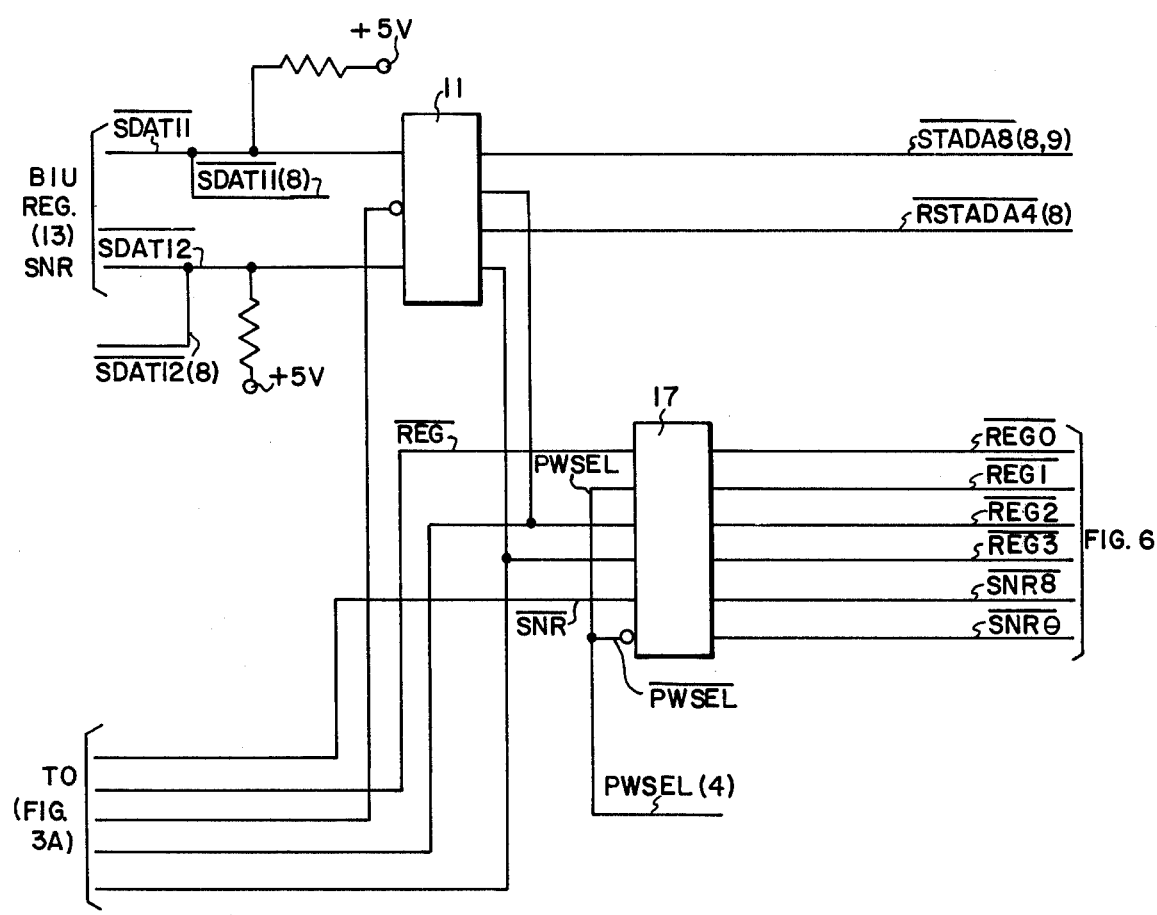

Details of the common control circuit and register control circuits disclosed in this application will be given followed by an overall system description. Referring now to FIG. 3, the address latches for bits 1-12 corresponding to signals (signal leads) $\overline{SDAT01}$ through $\overline{SDAT12}$ are shown. The circuit is composed of 7400-Series Transistor Transistor Logic (TTL). These commercial circuits include latches 10 and 11 which are 7475 bistable two bit latches, gates 12–16 which are 7400 two input NAND gates, and decoder 17 which is a 74154 dual one out of four decoder.

All data input leads $\overline{SDAT01}$-$\overline{SDAT12}$ are connected through resistors to a plus 5 volts source holding them normally at a high level. The address information is presented on these leads in a true low format (under normal operation) whereby a logic 1 pulls the lead potential down to 0 volts. Bits 9 and 10 on $\overline{SDAT09}$ and $\overline{SDAT10}$, respectively, feed the inputs of latch 10. These leads through latch 10 are decoded to indicate whether a sender (SNR) or sender flag, or a register (REG) or register flag (FLAG) are being referenced. Bits 11 and 12 on $\overline{SDAT11}$ and $\overline{SDAT12}$, respectively, are then decoded through latch 11 and decoder 17 to indicate which of the four registers or two senders are being referenced. If the signal PWSEL is high at decoder 17 and the signal $\overline{REG}$ is low, then the register outputs $\overline{REG0}$-$\overline{REG3}$ will go low for the inputs from latch 11 to decoder 17 of 00, 01, 10, and 11 respectively, selecting registers 0, 1, 2, or 3. If however signal $\overline{PWSEL}$ is low at decoder 17 and $\overline{SNR}$ is low then the sender outputs $\overline{SNR8}$ and $\overline{SNR\theta}$ are selected low for the same inputs from latch 11 (00, 01, 10, and 11) selecting SNR8 at 00, and SNRθ at 10 with the other two presently being unused. Signals $\overline{SDAT09}$-$\overline{SDAT12}$ are also used to address a particular four bit store in the tally store (16 words × 4 bits). These signals gated through latches 10 and 11 produce output signals TALYA8, TALYA4, TALYA2, and TALYA1 which are taken directly to the address inputs of the store. If the tally store is to be used as a flag store, then a high signal FLAG is produced from gates 13 and 15 through gate 16. These signals (REG0, REG1, REG2, REG3, SNR8, and SNRθ) are then directed to FIG. 6 to select the correct progress word (PW). Figures in parenthesis (on each FIG.) after the signal leads indicate the figure of the drawings that these leads are connected to.

Figure 4:
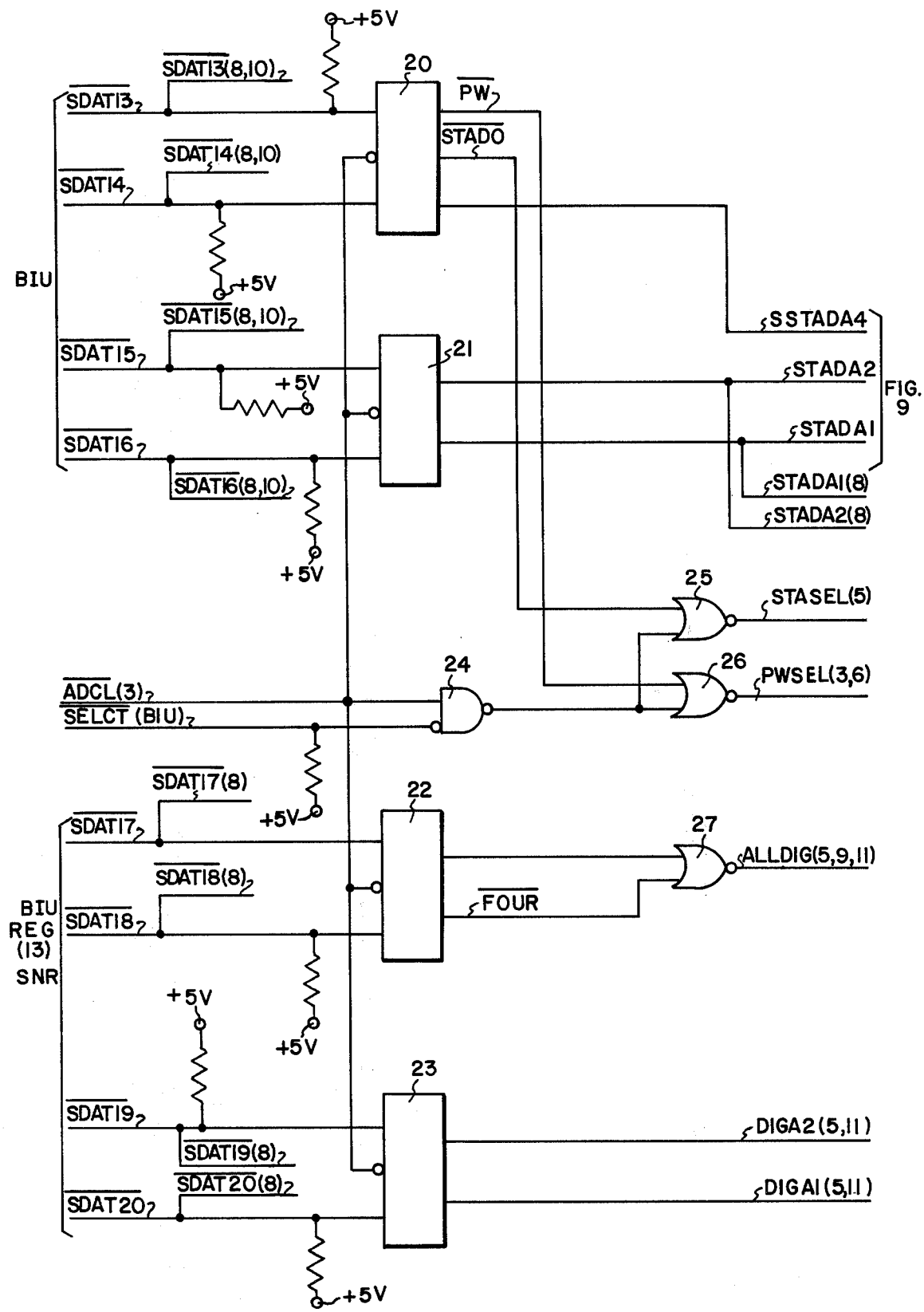

FIG. 4 shows the address latches for bits 13–20 corresponding to leads $\overline{SDAT13}$-$\overline{SDAT20}$. This circuit is also composed of commercial 7400 logic including latches 20-23 which are 7475 bistable two bit latches, gate 24 which is a 7400 two input NAND gate, and gates 25-27 which are 7402 two input NOR gates. When signal $\overline{SDAT13}$ is true it indicates that a register or sender progress word will be selected as indicated by the output $\overline{PW}$ of latch 20. When $\overline{SDAT13}$ is not true it requests a register or sender store referred to on $\overline{SDAT14}$-$\overline{SDAT16}$. These commands are clocked through the gates 25 and 26 to become signal STASEL (store address select) or PWSEL (progress word select). $\overline{SDAT-17}$-$\overline{SDAT20}$ address which digit of the store referred to by $\overline{SDAT09}$-$\overline{SDAT16}$ is to be read. The bus control signal $\overline{SELCT}$ is inverted at gate 24 and when $\overline{ADCL}$ goes high (completed) they produce signal $\overline{ADSEL}$ at the output of gate 24 indicating the address can now be used. Signals $\overline{ADSEL}$ and $\overline{STADD}$ (store address from latch 20) at gate 25 produce STASEL the store address select. Signals $\overline{ADSEL}$ and $\overline{PW}$ at gate 26 produce PWSEL the progress word select. A register common store requires a four bit address to select one of the sixteen words contained therein. Signals $\overline{SDAT11}$ and $\overline{SDAT12}$ are gated through latch 11 to produce signal $\overline{STADA8}$ and $\overline{RSTADA4}$ which are inverted to provide addressing signals STADA8 and STADA4. Signals $\overline{STAD15}$ and $\overline{SDAT16}$ are gated through latch 21 to provide signals STADA2 and STADA1 for the register common store addresses. For the sender common store signal $\overline{SDAT14}$ is gated through latch 20 to produce signal SSTADA4.

The information presented on bits 9–20 corresponding to leads $\overline{SDAT09}$-$\overline{SDAT20}$ produce the particular addresses of individual units shown in the following four tables.

Table 1

| SDAT BITS | 9 | 10 | 11 | 12 | STORE |
|---|---|---|---|---|---|
| | 0 | 0 | 0 | 0 | REG 0 |
| | 0 | 0 | 0 | 1 | REG 1 |
| | 0 | 0 | 1 | 0 | REG 2 |
| | 0 | 0 | 1 | 1 | REG 3 |
| | 0 | 1 | 0 | 0 | REG 0 FLAG STORE |
| | 0 | 1 | 0 | 1 | REG 1 FLAG STORE |
| | 0 | 1 | 1 | 0 | REG 2 FLAG STORE |
| | 0 | 1 | 1 | 1 | REG 3 FLAG STORE |
| | 1 | 0 | 0 | 0 | SNR 8 |
| | 1 | 0 | 0 | 1 | SNR 8 FLAG STORE* |
| | 1 | 0 | 1 | 0 | SNR θ |
| | 1 | 0 | 1 | 1 | SNR θ FLAG STORE* |
| | 1 | 1 | 0 | 0 | REG 0 FLAG STORE |
| | 1 | 1 | 0 | 1 | REG 1 FLAG STORE |
| | 1 | 1 | 1 | 0 | REG 2 FLAG STORE |
| | 1 | 1 | 1 | 1 | REG 3 FLAG STORE |

Table 2

| SDAT BITS | 13 | 14 | 15 | 16 | REGISTER STORES |
|---|---|---|---|---|---|
| | 0 | 0 | 0 | 0 | DN0 |
| | 0 | 0 | 0 | 1 | DN1 |
| | 0 | 0 | 1 | 0 | DN2 |
| | 0 | 0 | 1 | 1 | EN |

Table 3

| $\overline{SDAT}$ BITS | Sender Store Addresses 13 14 15 16 | SENDER STORES |
|---|---|---|
| | 0 0 0 0 | DN0 |
| | 0 0 0 1 | DN1 |
| | 0 0 1 0 | DN2 |
| | 0 0 1 1 | DN3 |
| | 0 1 0 0 | EN |
| | 0 1 0 1 | JEN |
| | 0 1 1 0 | AN10 |
| | 0 1 1 1 | AN11 |

Table 4

| $\overline{SDAT}$ BITS | Store Digit Addressing 17 18 19 20 | DIGIT |
|---|---|---|
| | 0 0 0 0 | 0 |
| | 0 0 0 1 | 1 |
| | 0 0 1 0 | 2 |
| | 0 0 1 1 | 3 |
| | 0 1 0 0 | ALL DIGITS |

Figure 5A:
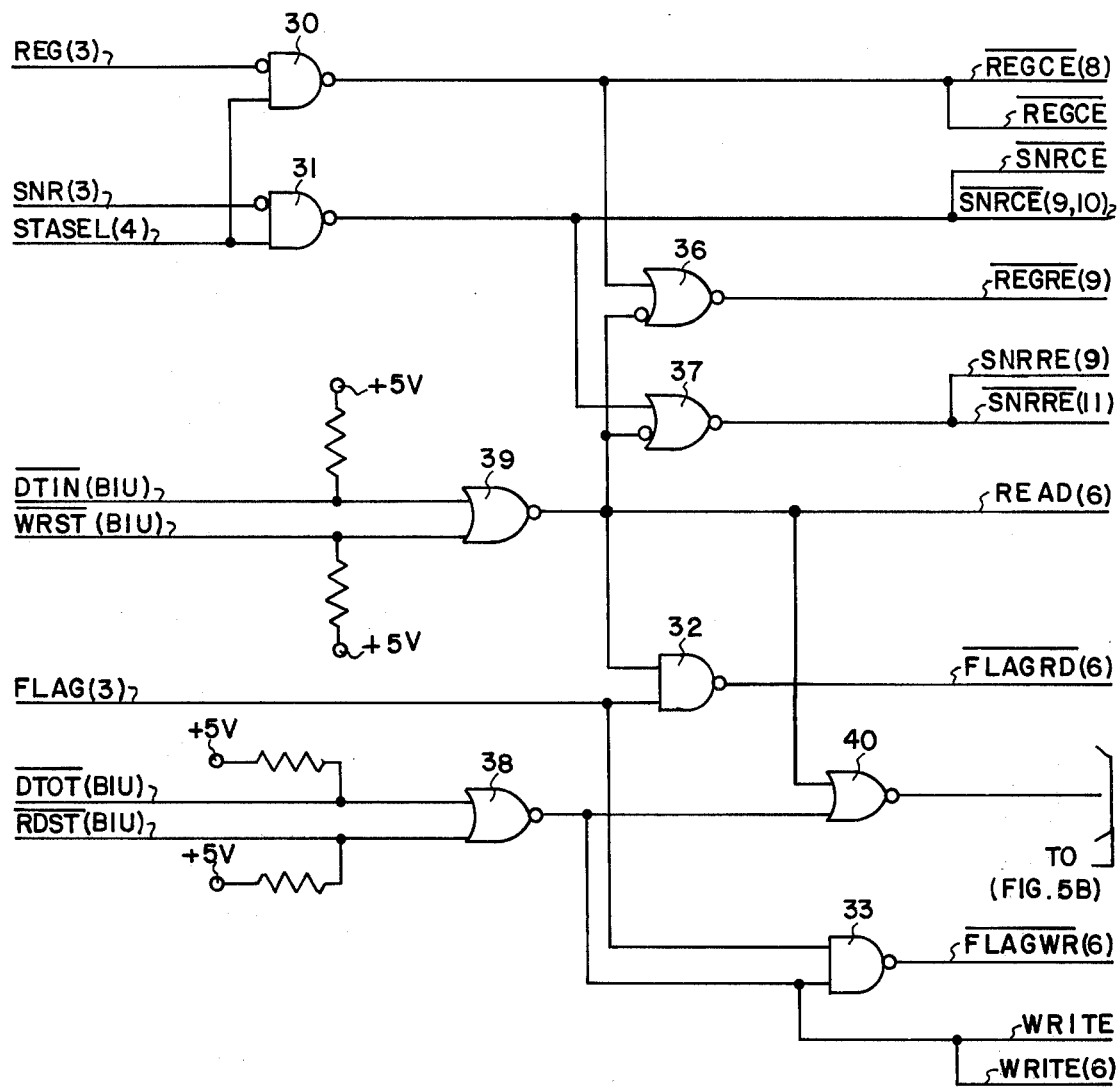
FIG. 5 (5A and 5B) shows the common store control of the common control.
Figure 5B:
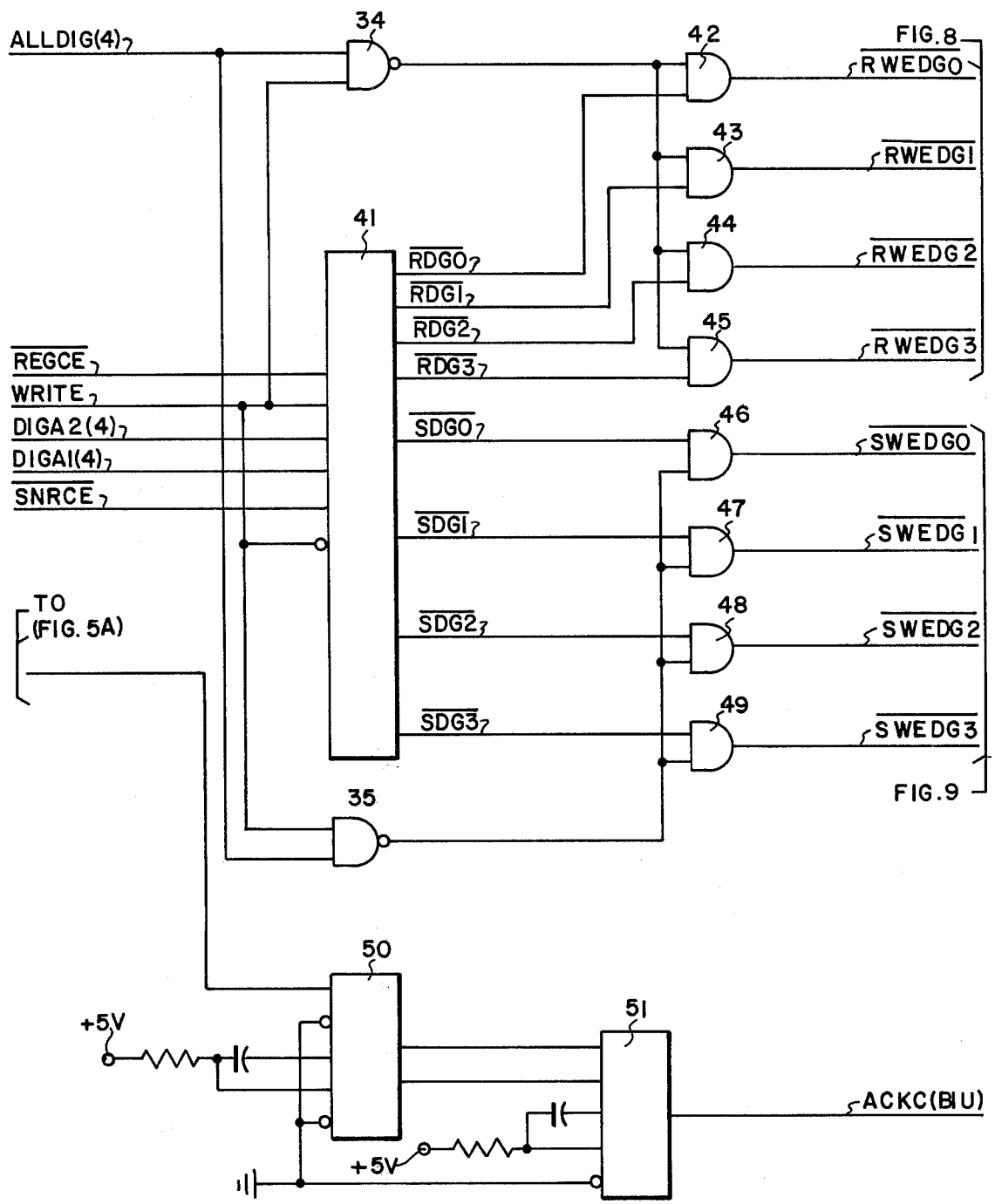

FIG. 5 shows the common store control. The circuit is composed of 7400 logic including gates 30-35 which are 7400 two input NAND gates, gates 36-40 which are 7402 two input NOR gates, decoder 41 which is a 74154 one out of four decoder, gates 42-49 which are 7408 two input AND gates, and monostables 50 and 51 which are 74121 monostable multivibrators. BIU signals $\overline{DTIN}$ and $\overline{WRST}$ are input to gate 39 and when they are both low, gate 39 produces a high signal READ. Signal READ indicates data is to be taken into the central processor. BIU signals $\overline{DTOT}$ and $\overline{RDST}$ are input to gate 38 and when both are low, gate 38 produces a high signal WRITE. This signal indicates data is to be read into the registers or senders from the central processor. Leads REG and SNR which were decoded from $\overline{SDAT09}$-$\overline{SDAT12}$ on FIG. 3 are gated through gates 30 and 31 respectively by the signal STASEL to yield the memory control signals $\overline{REGCE}$ and $\overline{SNRCE}$. These signals are gated by the inverse of signal READ (from subsystem onto bus) to derive the $\overline{REGRE}$ and $\overline{SNRRE}$ command signals. The FLAG signal is also gated by the READ signal through gate 32 to produce the $\overline{FLAGRD}$ (frag read) command signal. The ACKC (acknowledge) signal from monostable 51 informs the BIU that either the flag has been read ($\overline{FLAGRD}$ is not true), the RSC has been written into (WRITE is true), or the RSC has been read out of. When a data transfer is initiated (signals $\overline{DTIN}$ and $\overline{WRST}$ are present or when signals DTOT and RDST go true) monostable 50 fires for 380 milliseconds, this timing allows sufficient time for any decoding control or data transfer which may be required. When monostable 50 expires it causes monostable 51 to fire and thereby produce signal ACKC true for 150 milliseconds. Thus the BIU is informed of the completed data transfer.

Signals DIGA1 and DIGA2 call up the required digits of the reference store to be decoded by decoder 41. Gating for register or sender digits is accomplished by signals $\overline{REGCE}$, $\overline{SNRCE}$, and WRITE. If all digits are required, decoder 41 is bypassed and the WRITE signal in combination with the $\overline{SNRCE}$ or $\overline{REGCE}$ signals call up either all sender digit commands SWEDG0-SWEDG3 or all register digit commands RWEDG0-RWEDG3, respectively.

The stores are completely addressable by the central processor through the common store control. This allows complete flexibility, however, they will be discussed here in a manner to fulfill the requirements of System S2.

Figure 6:
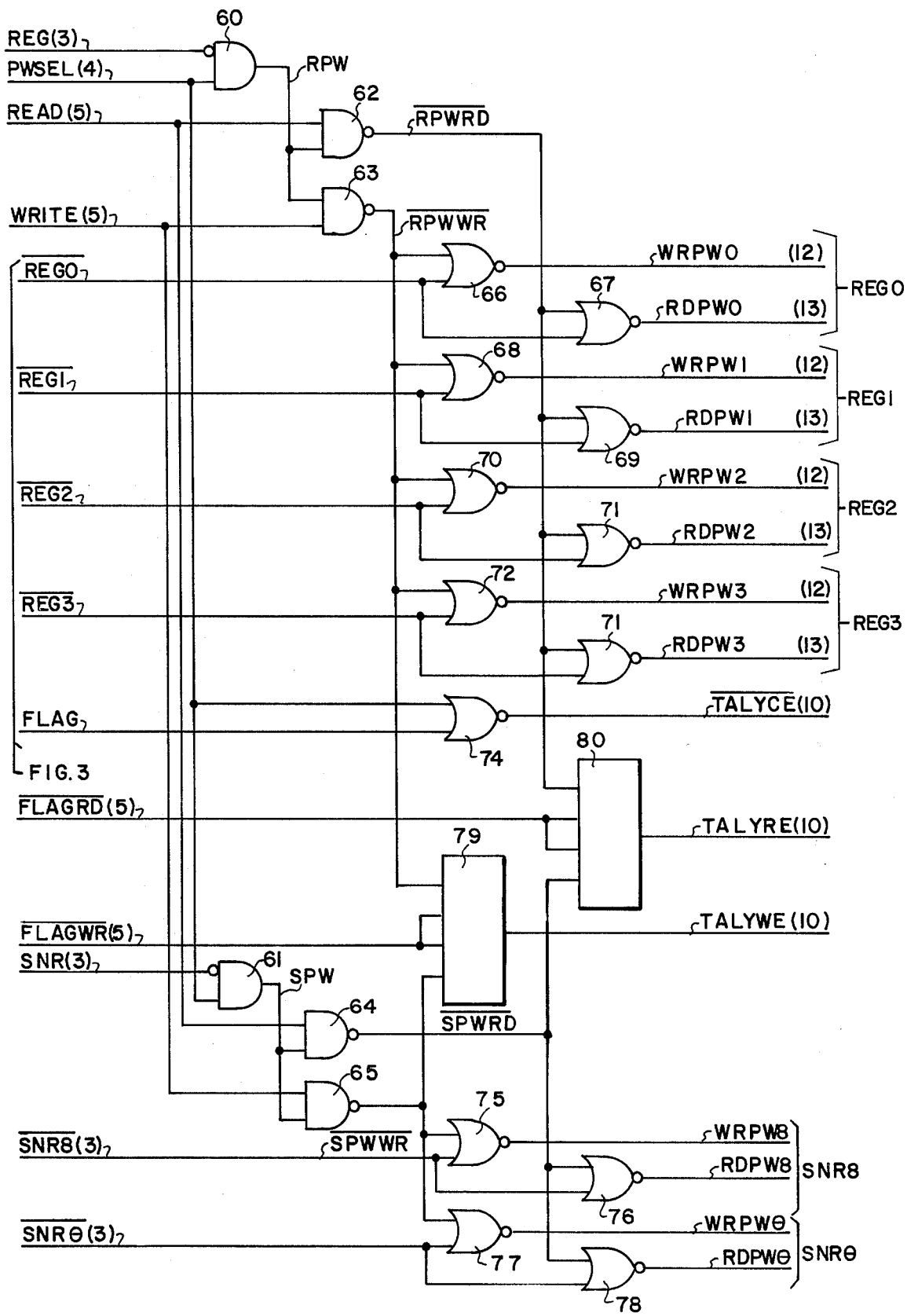
FIG. 6 shows the progress word and tally control of the common control.

FIG. 6 is a schematic diagram of the progress word and the tally control. This circuit is also composed of 7400 commercial logic including gates 60 and 61 which are 7408 two input AND gates, gates 62-65 are 7400 two input NAND gates, gates 66-78 are 7402 two input NOR gates, and gates 79 and 80 are 7420 four input NAND gates. When signals REG and PWSEL are true gate 60 will produce high output RPW (register progress word). Signals RPW and READ being high at gate 62 produce an output from gate 62 $\overline{RPWRD}$ (register progress word read). The signal $\overline{RPWRD}$ enable the particular register read progress word when gated through gates 67, 69, 71, or 73 as shown by the following table.

Table 5

| Gate | Both Inputs Low | Produces High |
|---|---|---|
| 67 | $\overline{REG0}$ + $\overline{RPWRD}$ | RDPW0 (Read Progress Word 0) |
| 69 | $\overline{REG1}$ + $\overline{RPWRD}$ | RDPW1 (Read Progress Word 1) |
| 71 | $\overline{REG2}$ + $\overline{RPWRD}$ | RDPW2 (Read Progress Word 2) |
| 73 | $\overline{REG3}$ + $\overline{RPWRD}$ | RDPW3 (Read Progress Word 3) |

Similarly the signals WRITE and RPW gated into gate 63 produce low signals $\overline{RPWWR}$ (register progress word write). This signal $\overline{RPWWR}$ gated through gates 66, 68, 70, or 72 produce the appropriate signals to enable the particular register write progress words as shown by the following table.

Table 6

| Gate | Both Inputs Low | Produces High |
|---|---|---|
| 66 | $\overline{REG0}$ + $\overline{RPWWR}$ | WRPW0 (Write Progress Word 0) |
| 68 | $\overline{REG1}$ + $\overline{RPWWR}$ | WRPW1 (Write Progress Word 1) |
| 70 | $\overline{REG2}$ + $\overline{RPWWR}$ | WRPW2 (Write Progress Word 2) |
| 72 | $\overline{REG3}$ + $\overline{RPWWR}$ | WRPW3 (Write Progress Word 3) |

In a like manner signals SNR and PWSEL high into gate 61 produce high signals SPW (sender progress word). Signals PSW and READ high into gate 64 produce low signal $\overline{SPWRD}$ (sender progress read). Signals SPW and WRITE high into gate 65 produce low signal $\overline{SPWWR}$ (sender progress word write). Signal $\overline{SPWRD}$ gated into gates 76 and 78 produce the particular sender read progress word for the appropriate sender and signal $\overline{SPWWR}$ gated into gates 75 and 77 produce the particular write progress word for the particular senders as shown in the following table.

Table 7

| Gate | Input A Low | Input B Low | Output High |
|---|---|---|---|
| 76 | $\overline{SPWRD}$ | $\overline{SNR8}$ | RDPW8 Read Progress Word 8 |
| 78 | $\overline{SPWRD}$ | $\overline{SNR\Theta}$ | RDPWΘ Read Progress Word Θ |
| 75 | $\overline{SPWWR}$ | $\overline{SNR8}$ | WRPW8 Write Progress Word 8 |
| 77 | $\overline{SPWWR}$ | $\overline{SNR\Theta}$ | WRPWΘ Write Progress word Θ |

Figure 10A:
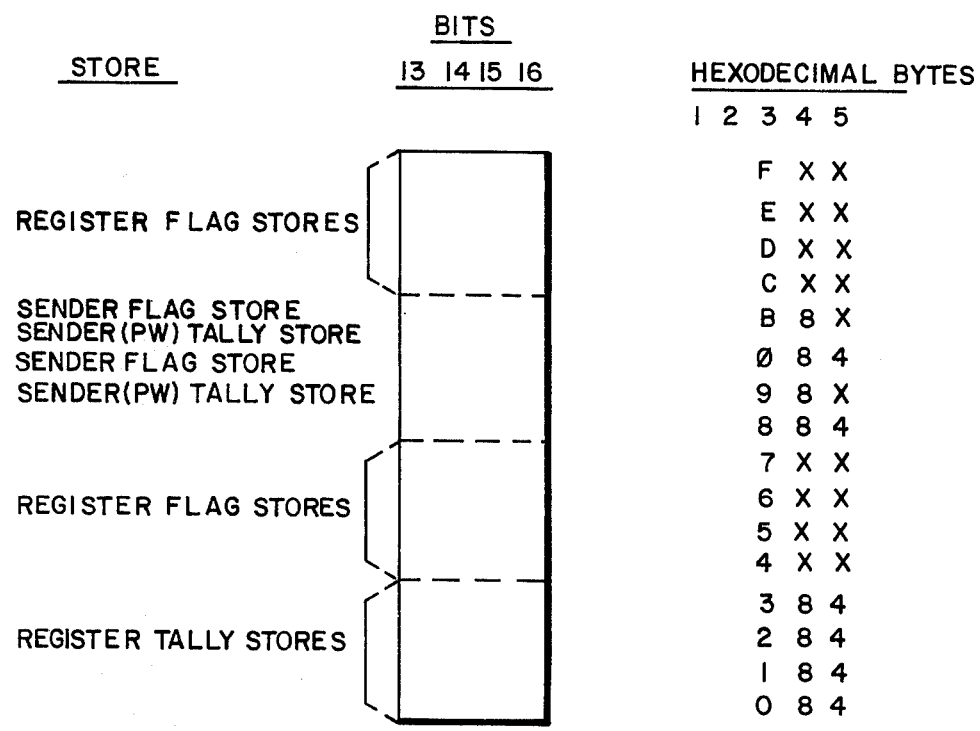
FIG. 10A shows the layout of the tally store.
Figure 10B:
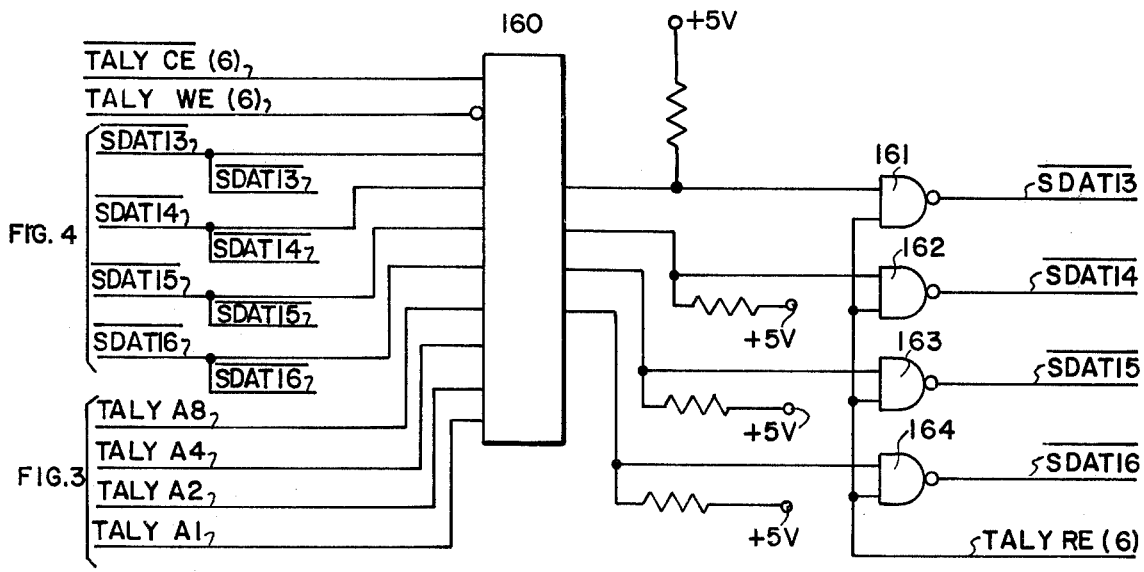
FIG. 10 (10B) shows the tally store of the common control.

The tally store as shown on FIG. 10 has two applications. Some locations are actually used as bits 13–16 of the progress words (See Table 1). Therefore, the store must be addressed and enabled at the same time as the progress word selection just described. Signals $\overline{\text{SDAT09}}$-$\overline{\text{SDAT12}}$ address and select a particular four bit store in the tally store (16 bit word by 4 bits) as shown on FIG. 3. To enable the tally store signal PWSEL is gated through gate 74 to produce low signal $\overline{\text{TALYCE}}$ (tally chip enable). Either of signals $\overline{\text{RPWRD}}$ or $\overline{\text{SPWRD}}$ gated into gate 80 produce signals TALYRE (tally read enable) for the tally store as shown on FIG. 10. Either signal $\overline{\text{RPWWR}}$ or $\overline{\text{SPWWR}}$ gated into gate 79 produce signal TALYWE (tally write enable) for the tally store. These control signals together with the tally addresses described on FIG. 3 are for information on $\overline{\text{SDAT13}}$-$\overline{\text{SDAT16}}$ to be stored (write enable) or for information which has been stored to be read out and appear on the same lines (read enable). Two other signals also produce the outputs from gate 80 and gate 79 respectively. These are flag signals $\overline{\text{FLAGRD}}$ gated into gate 80 and $\overline{\text{FLAGWR}}$ gated into gate 79.

Figure 7:
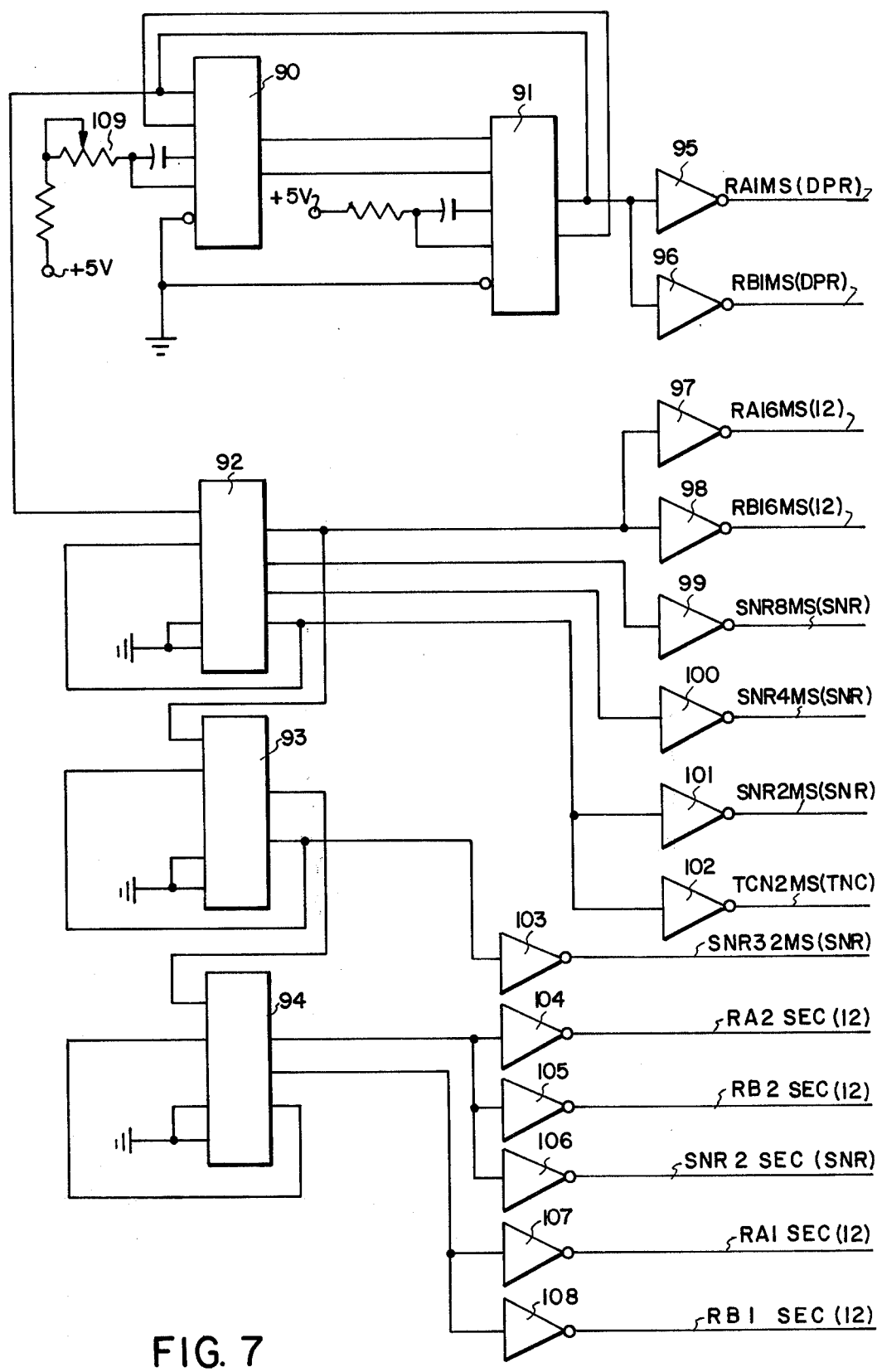
FIG. 7 shows the clock circuitry of the common control.
Figure 14A:
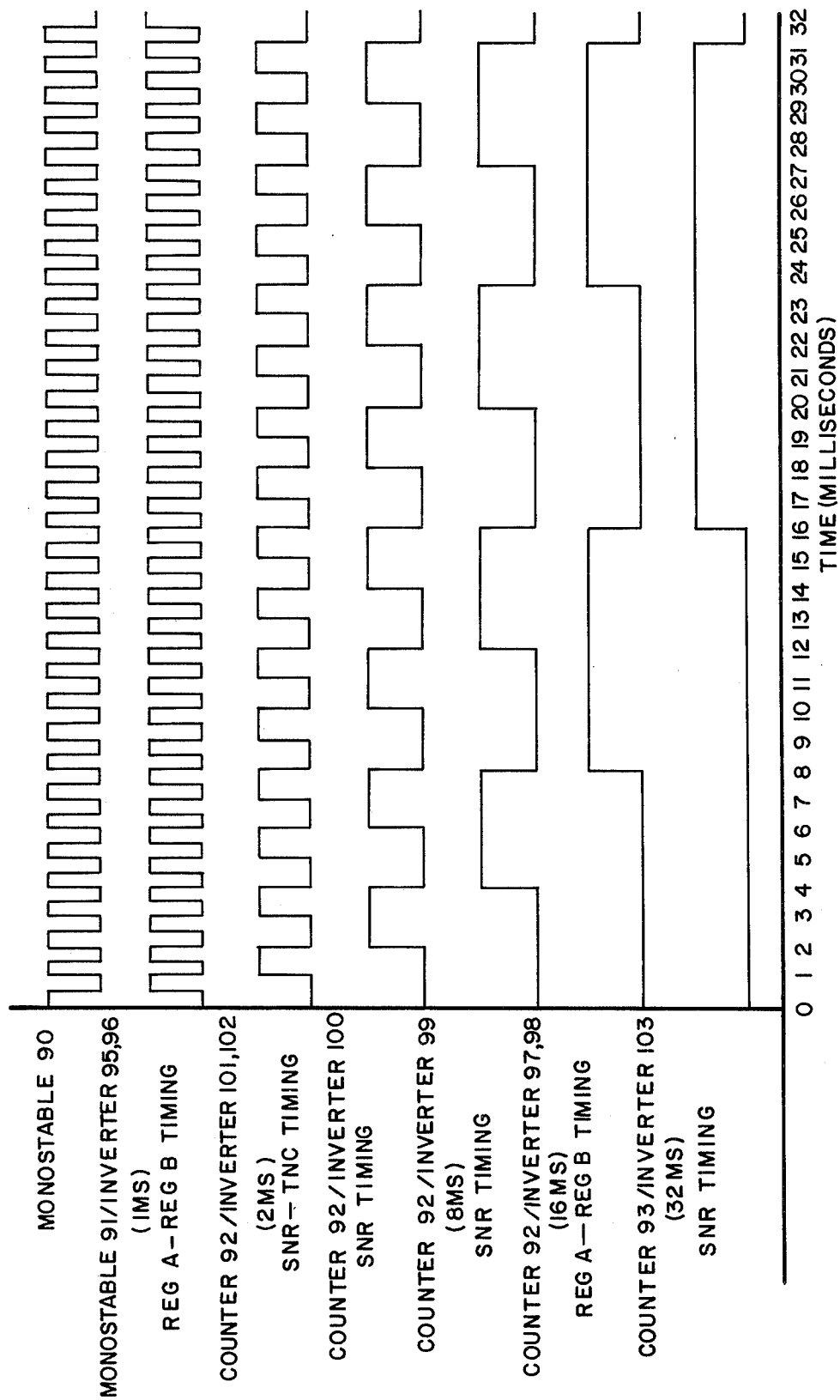
FIG. 14 (14A and 14B) shows the clock pulses and timing for the register and sender module.
Figure 14B:
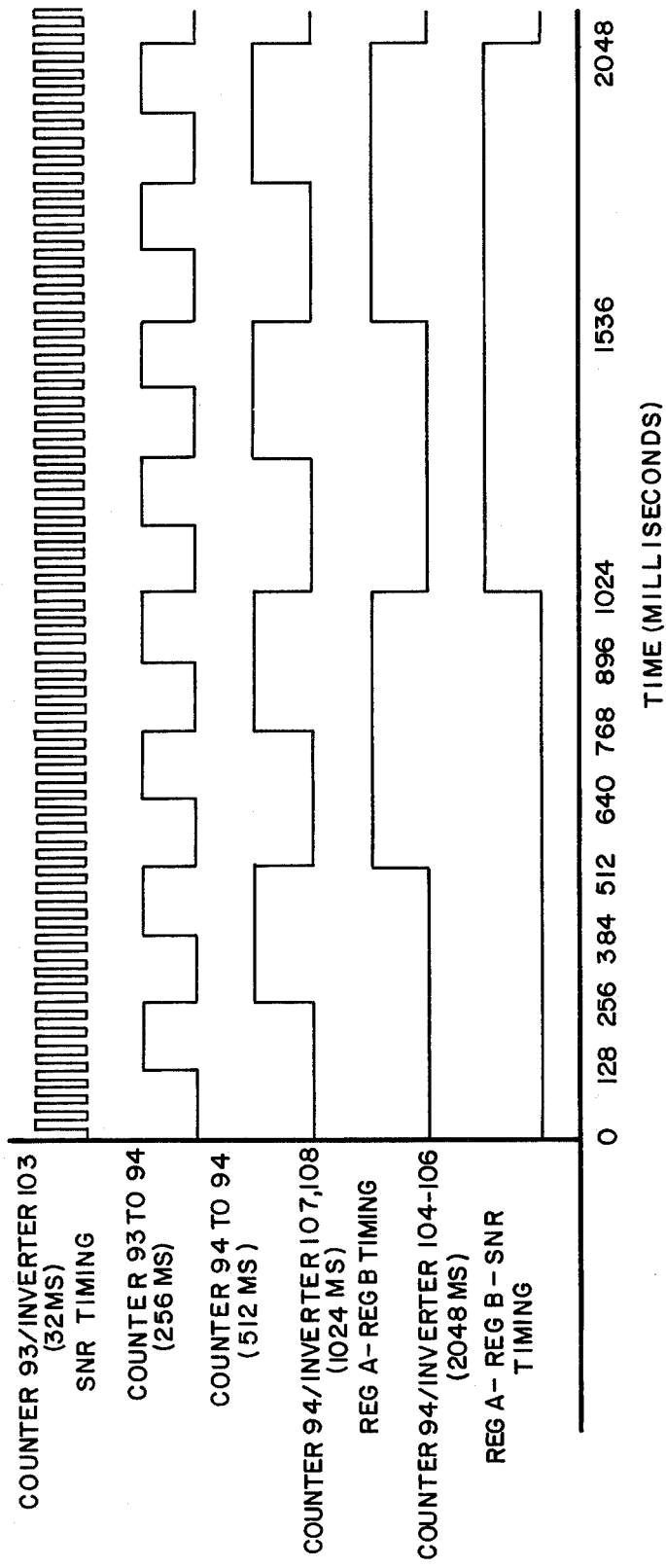

FIG. 7 shows the schematic diagram of the common module clock for the register and sender arrangement. The circuit is composed of 7400 logic including monostables 90 and 91 which are 74121 monostable multivibrators, counters 92-94 which are 7493 four bit binary counters, and drivers 95-108 which are 7404 hex inverter drivers. Monostables 90 and 91 form a multivibrator circuit at a 1 millisecond frequency and all other outputs are counted down from there and distributed to the particular registers, senders, tone control circuits (TNC), and dial pulse receivers (DPR) as required. FIG. 14 shows a complete timing chart. Monostables 90 and 91 each provide 500 microsecond timing pulses and when coupled together oscillate to provide a 1 millisecond clock signal through the inverters to the DPR. The clock signal is fed into counter 92 which increases the period of the clock signal by a factor of 2 at each consecutive output, to derive the 2 millisecond, 4 millisecond, 8 millisecond, and 16 millisecond signals. The 16 millisecond signal is then fed to counter 93 which only uses the first and last outputs. The first output gives the 32 millisecond signal and the last output gives a 256 millisecond signal which is used to feed counter 94. In counter 94 the first three outputs are used to give the 1024 millisecond (1 second signal) and the 2048 millisecond (2 seconds) maximum output. A variable resistor 109 is provided for initial adjustment.

Figure 8A:
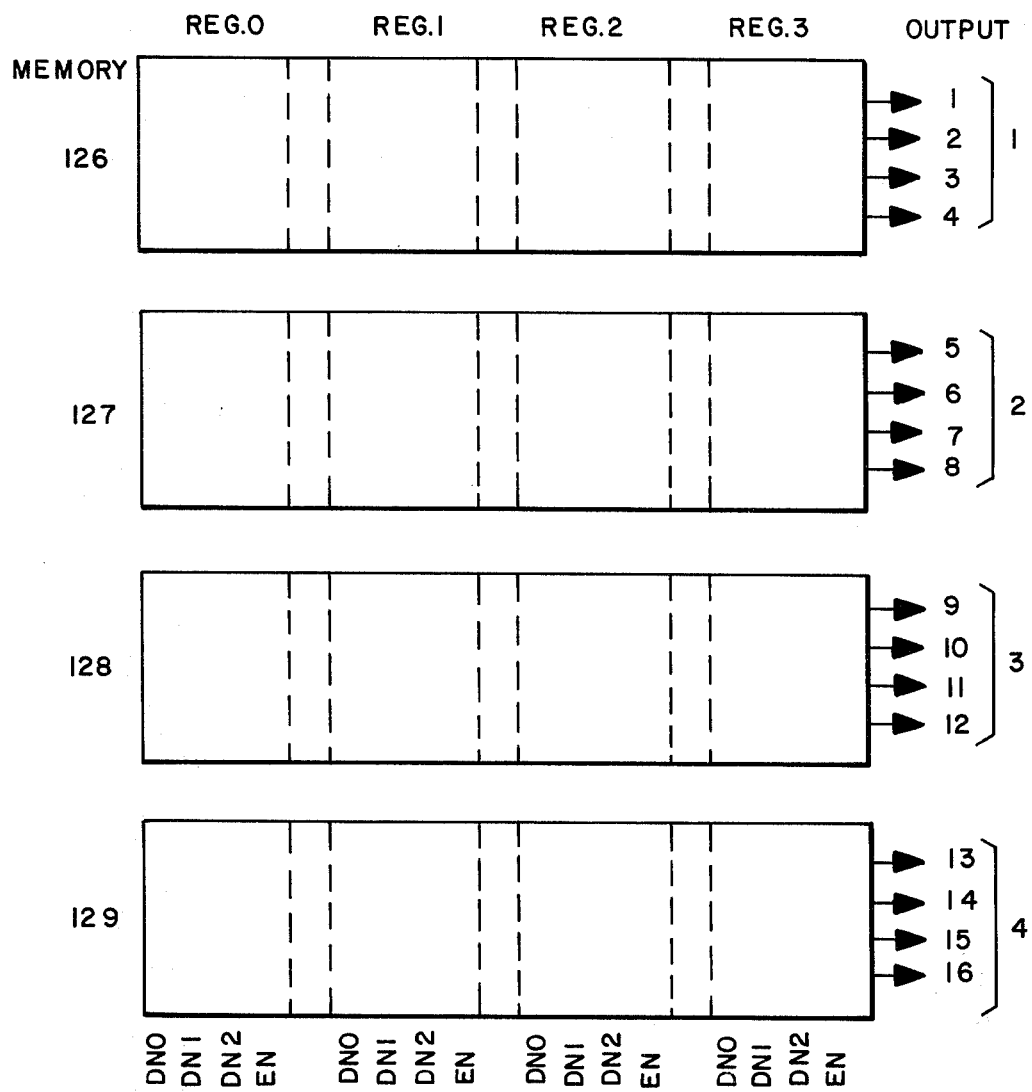
FIG. 8A shows the layout of the register common store.
Figure 8B:
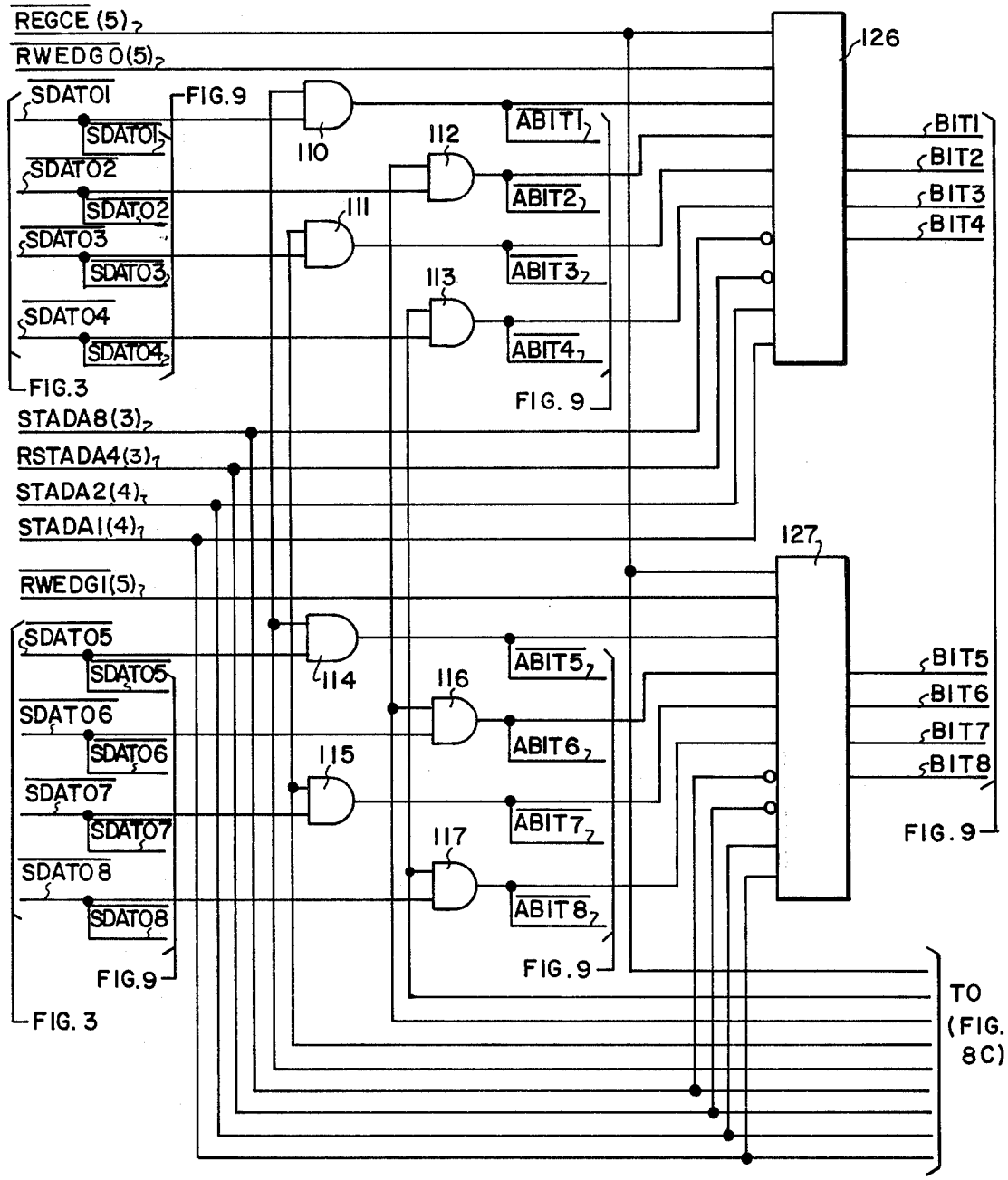
FIG. 8 (8B and 8C) shows the register common store of the common control.
Figure 8C:
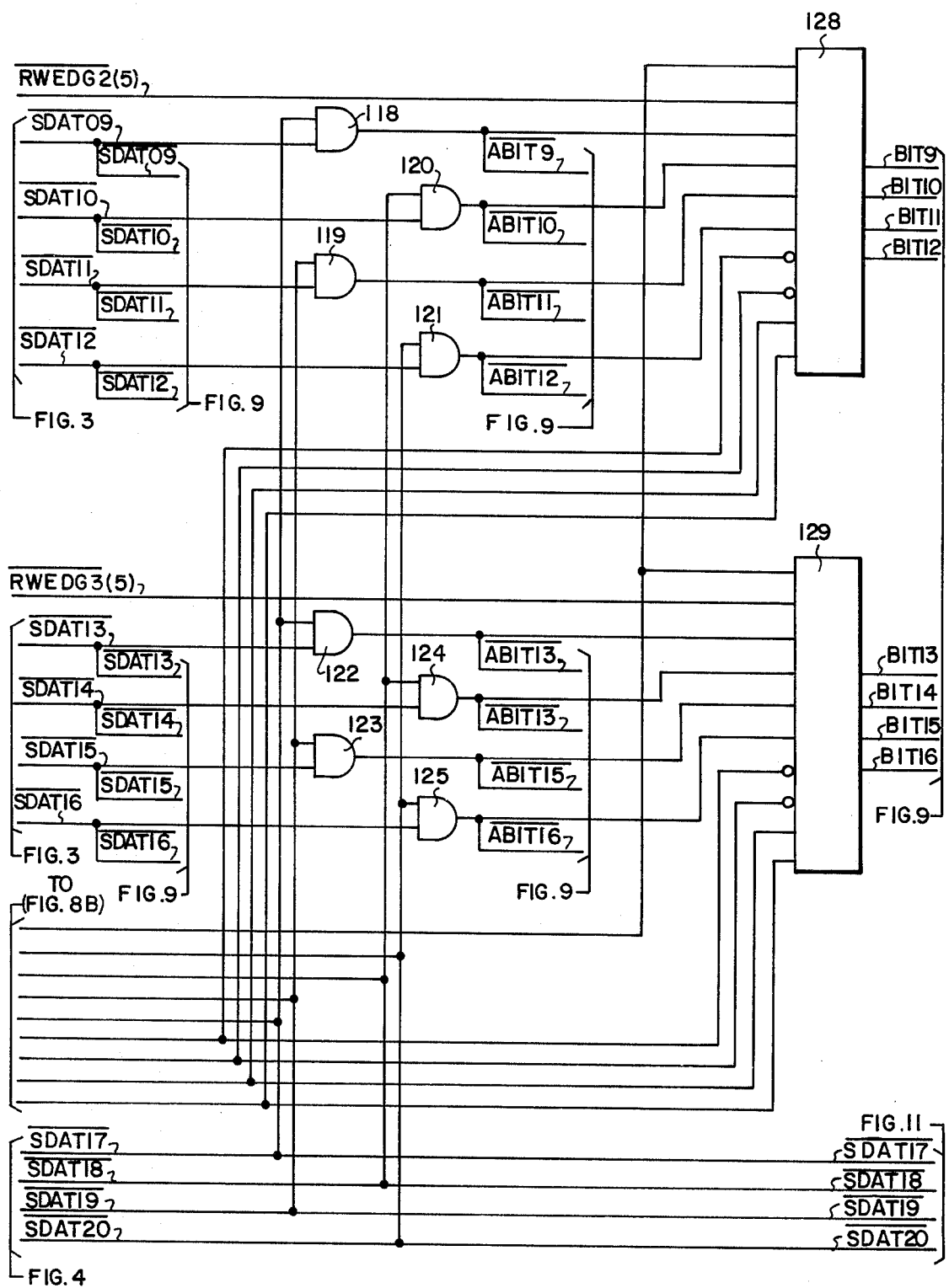

FIG. 8 shows one of the two main common stores provided in the common control, the register common store. These stores are completely addressable and not restricted by hardware, however, a specific description will be given. The circuit is composed of 7400 logic including gates 110-125 which are 7408 two input NAND gates, and memory chips 126-129 which are 7489 sixteen by four random access memories. They are laid out in 16 bit (4 byte) memories. The layout is shown in FIG. 8A for the particular layout of System S2.

This one register store provides storage for all four registers associated with the RSC module. The register common store requires a 4 bit address to select one of the 16 words. Each register has four 4 digit (16 bit) memory locations DN0, DN1, DN2, and EN, to store the dialed directory number and corresponding equipment number. The memory address leads are taken from FIG. 4 directly to the memory address inputs of FIGS. 8 and 9. Each register is provided with four 16 bit stores (16 bits or 4 digits hexadecimal). Three stores are directory number stores DN0, DN1, DN2, for a total of 12 digits storage in a common store (a 13th digit can be held in the register digit receiver). The fourth store is the equipment number store (EN). The EN store is initially used to store the four digit equipment number of the calling line, and later on a senderized call to store the equipment number of the associated sender. As previously described bits 9, 10, 11, and 12 designate a particular register or sender within an RSC module. These bits select the correct block of four words for the register. The word within this block (i.e. DN0, 1, 2, or EN) is selected by bits 13, 14, 15, and 16 as follows:

Table 8

| | Store Address Bits | 13 | 14 | 15 | 16 | Hex |
|---|---|---|---|---|---|---|
| Address | DN0 | 0 | 0 | 0 | 0 | 0 |
| | DN1 | 0 | 0 | 0 | 1 | 1 |
| | DN2 | 0 | 0 | 1 | 0 | 2 |
| | EN | 0 | 0 | 1 | 1 | 3 |

Thus, for register 1, DN2 the address in hexadecimal would be 12X where 1 indicates the register and 2 the word. The X in this address indicates which digit in DN2 you wish to address. The digit address is indicated in bits 17, 18, 19, and 20, as follows:

Table 9

| | Digit Address Bits | 17 | 18 | 19 | 20 | Hex |
|---|---|---|---|---|---|---|
| Address | Only digit 0 | 0 | 0 | 0 | 0 | 0 |
| | Only digit 1 | 0 | 0 | 0 | 1 | 1 |
| | Only digit 2 | 0 | 0 | 1 | 0 | 2 |
| | Only digit 3 | 0 | 0 | 1 | 1 | 3 |
| | All four digits | 0 | 1 | 0 | 0 | 4 |

Thus, if you wish to store a digit into register 3, DN0, digit 2, the address would be 302. As a general rule, hexadecimal four in the digit address position indicates a full word operation involving bits 1-6 inclusive. That is, all four digits are to be stored or read out in parallel. The address of the equipment number store for regsiter 0 would normally be 034 since the information in this store is usually used in a full word format.

In order to store a single digit (4 bits) of information into a register store, the digit must be placed in bit position 17, 18, 19, and 20. If the information is a dialed digit, the information automatically appears in these bit positions from the digit register in the progress word. When the particular digit position is addressed (using other than 4 in the last X address position) the information from bits 17, 18, 19, and 20 will be stored into that address.

When reading out of a register, all digits are always read out (using XX4). If a particular digit is addressed when reading out, the information will appear in bit positions corresponding to the digit's position in its store.

Figure 9A:
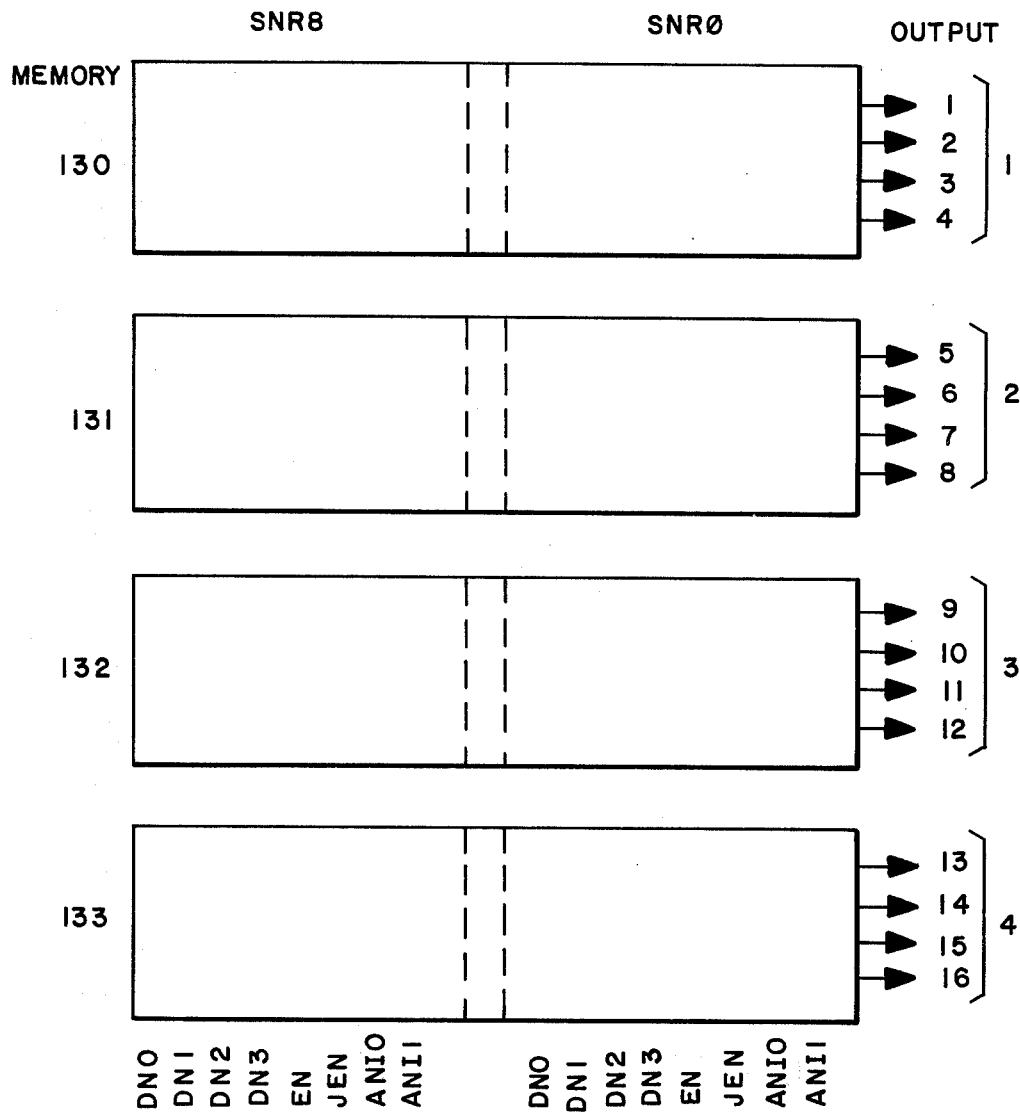
FIG. 9A shows the layout of the sender common store.
Figure 9B:
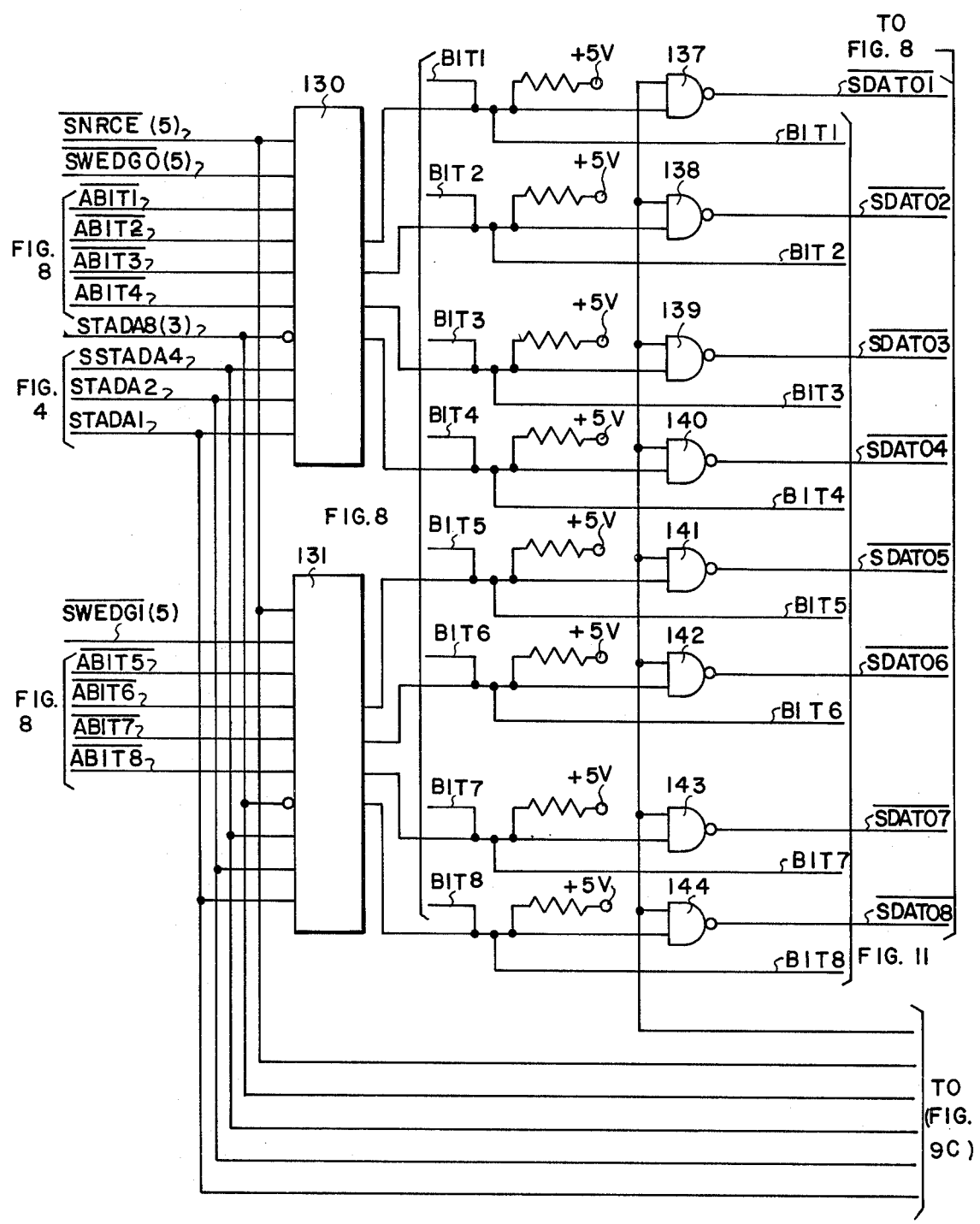
FIG. 9 (9B and 9C) shows the sender common store of the common control.
Figure 9C:
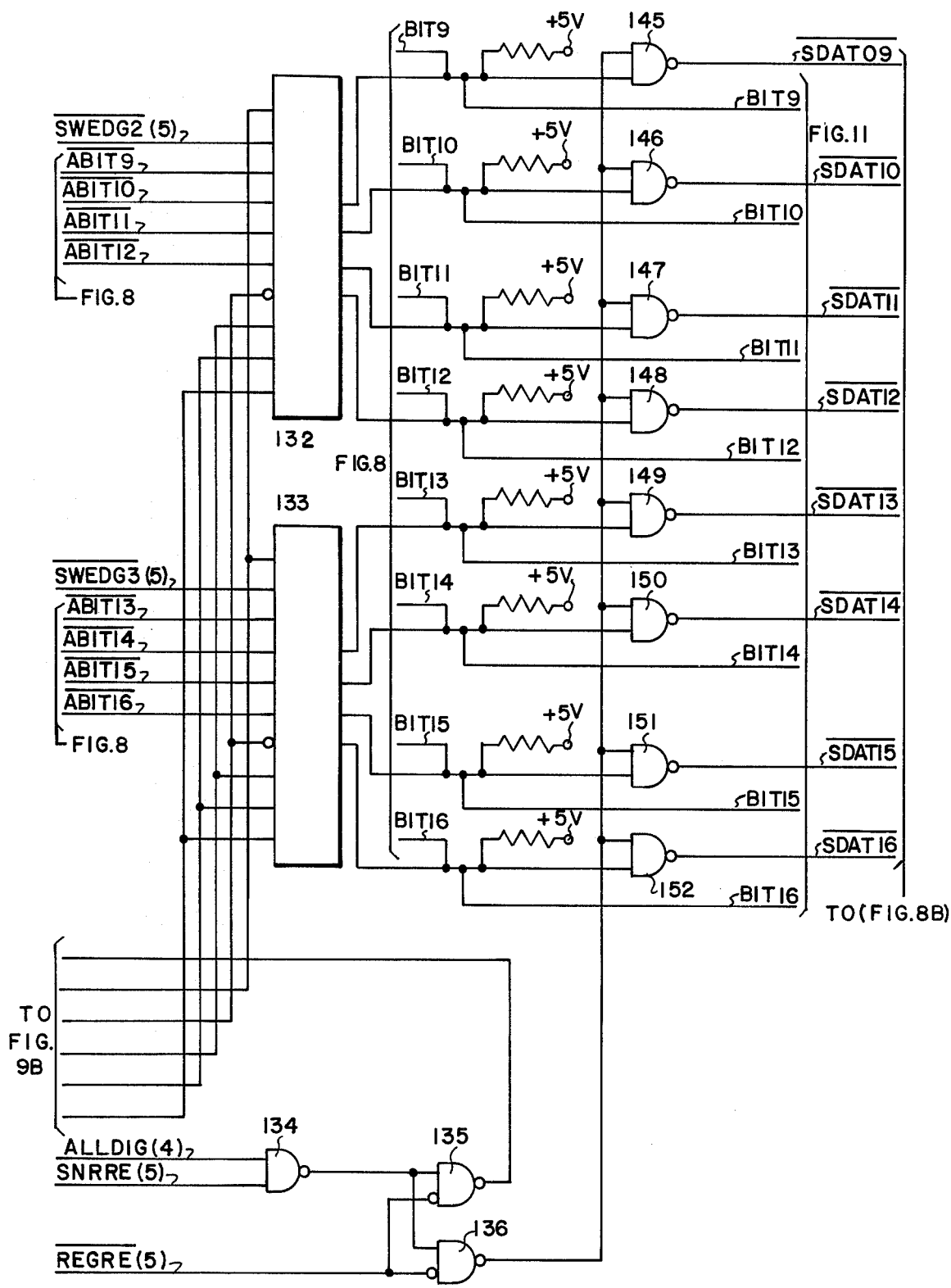

FIG. 9 shows the second large common store, the sender common store. The 7400 logic circuits include memories 130-133 which are 7489 16 by 4 random access memories, gates 134-136 which are 7400 two input NAND gates, and gates 137-152 which are 7438 two input NAND buffer gates with open collectors. Each sender is provided with eight, 16 bit (4 digit) stores. These stores are DN0, DN1, DN2, and DN3 for a total of 16 digit stores; EN for storing the equipment number of the associated register; JEN for storing the equipment number of the terminating junctor in the reserve path; ANI0 and ANI1 for calling equipment number during the associative search and finally calling directory number. Sender addressing is simply an extension of register addressing. If ABC is a hexadecimal sender address, A is the sender number (bits 9, 10, 11, and 12), B designates the store (bits 13, 14, 15, and 16), and C is the digit within the store (0, 1, 2, or 3; or 4 if all digits are being considered). The words of a sender store are as follows:

Table 10

| Bits | Sender Store Words | | | | Hex |
|------|----|----|----|----|-----|
|      | 13 | 14 | 15 | 16 |     |
| DN0  | 0  | 0  | 0  | 0  | 0   |
| DN1  | 0  | 0  | 0  | 1  | 1   |
| DN2  | 0  | 0  | 1  | 0  | 2   |
| DN3  | 0  | 0  | 1  | 1  | 3   |
| EN   | 0  | 1  | 0  | 0  | 4   |
| JEN  | 0  | 1  | 0  | 1  | 5   |
| ANI0 | 0  | 1  | 1  | 0  | 6   |
| ANI1 | 0  | 1  | 1  | 1  | 7   |

Again the sender progress word A84, where A is the sender number.

When storing a single digit into a sender store, as with a register, the information is placed in bits 17, 18, 19, and 20 and the particular digit is addressed. When reading a single digit out of a sender unlike a register store, if a particular digit is addressed the information will appear in bits 17, 18, 19, and 20 for any single digit. This is to facilitate loading of the sender down counter which is located in bit position 17, 18, 19, and 20 of the sender progress word. Again, all parallel operations in the common store involve bits 1–16 inclusive. The sender common store is organized as shown in FIG. 9A.

The significant feature of these memories is that not only can full words of 16 bits be selected, but one particular 4 bit byte can also be addressed (a single digit). $\overline{SDAT17}$-$\overline{SDAT20}$ select one of the bytes or all of the bytes as shown in FIG. 4. The signal ALLDIG (all digits) also comes from FIG. 4 and will select all four bytes. The outputs from latch 23 of FIG. 4 are decoded to select one of four bytes through signals DIGA2 and DIGA1 and decoder 41 of FIG. 5. Signals $\overline{RECGE}$ and $\overline{WRITE}$ enable the outputs of decoder 41 to gates 42–45. In binary fashion, signals DIGA2 and DIGA1 select one of the four outputs which goes low. This will enable the respective gates 42–45 to produce signal $\overline{RWEDG0}$, $\overline{RWEDG1}$, $\overline{RWEDG2}$, or $\overline{RWEDG3}$ (register write enable digits 0, 1, 2, or 3). These signals in turn individually control the WE (write enable) inputs of the four memories, 126–129 of the register common store, FIG. 8. Similarly, signals $\overline{SNRCE}$ and $\overline{WRITE}$ (inverted at the input to decoder 41) enable one of the signals $\overline{SWEDG0}$ through $\overline{SWEDG3}$ (sender write enable digits 0, 1, 2, or 3) through gates 46–49. If signal ALLDIG is true then all gates 42–49 are enabled to select all digits of the register or sender. The signals ALLDIG and WRITE are gated into gate 34 for a register and the signals ALLDIG and WRITE are gated into gate 35 for a sender. With those signals present, the selection of which memory is done by signal $\overline{REGCE}$ for a register or signal $\overline{SNRCE}$ for a sender, as previously discussed.

If the single byte or digit method of access is used, the data to be stored is placed on $\overline{SDAT17}$-$\overline{SDAT20}$. There are in fact, the bit positions where the dialed digits appear in the register progress word. In the register or sender common store:

$\overline{SDAT17}$ is multiplied to gates 122, 118, 114, and 110;

$\overline{SDAT18}$ is multiplied to gates 124, 120, 116, and 112;

$\overline{SDAT19}$ is multiplied to gates 123, 119, 115, and 111; and $\overline{SDAT20}$ is multiplied to gates 125, 121, 117, and 113.

These gates have the normal inputs for data to each memory on their other input. If either input goes low, the output goes low, and the output will be stored in one or all bytes depending on the WE inputs to the memories. This apparatus is used for single digit storage in either a register or a sender common store.

In System S2 reading a single digit was only useful in the sender common store application. Further details may be found in the discussion of FIG. 11.

FIG. 10 shows the tally store composed of commerical 7400 logic including memory 160 which is a 7489 sixteen by four random access memory, and gates 161–164 which are 7438 two input NAND buffer gates with open collectors. The tally store has two applications. Some locations are actually used as bits 13–16 of the progress word. Therefore, the store must be addressed and enabled at the same time as the progress word selection. A particular four bit store in the tally store is selected by one of the signals TALYA8, TALYA4, TALYA2, and TALYA1, from FIG. 3. The signal PWSEL on FIG. 6 gated through gate 74 produces the low signal $\overline{TALYCE}$ (tally store enable). The signals TALYRE (tally read enable) and TALYWE (tally write enable) are also produced on FIG. 6 by gates 80 and 79. Signal $\overline{TALYCE}$ gated into memory 160 causes the inverse of what was stored to appear at its inputs to gates 161–164. The signal TALYRE to the second inputs of gates 161–164 causes the proper polarity to appear at the outputs on the respective $\overline{SDATXX}$ lines.

If the tally store is to be used as a flag store, then as discussed in FIG. 3, the output signal FLAG from gate 16 indicates this. The signal FLAG and signal READ into gate 32 of FIG. 5 produces a signal $\overline{FLAGRD}$ (flag read). Signals FLAG and WRITE into gate 33 produces a signal $\overline{FLAGRW}$ (flag write). Now in FIG. 6 the signal $\overline{FLAGRD}$ low into gate 80 produces the signal TALYRE to the tally store memory 160 as before and $\overline{FLAGWR}$ low into gate 79 produces a signal TALYWE which is inverted to the memory 160 as before. In addition to the storage mentioned with the register store, each register contains a 20 bit word reflecting the instantaneous state of that register. This progress word (PW) is physically located mostly on the register card. However bits 13, 14, 15, and 16 of each progress word are located in the tally store. As shown in FIG. 10A part of this store is used for the flag store as described in a register store. Also note that the register and sender tally stores are part of the progress word. For both registers and senders, the PW is considered as word eight. Therefore, the address of the progress word is X84 where X is the register or sender number (0, 1, 2, or 3; or 8 or 0 respectively). In the case where non existent B or 9 device addresses (byte 3) are used with the PW8, only a four bit flag store is addressed since there is no PW for these addresses (as shown in FIG.

10A and Table 1). The 4 indicates all digits (in this case 5) are being addressed.

Figure 11:
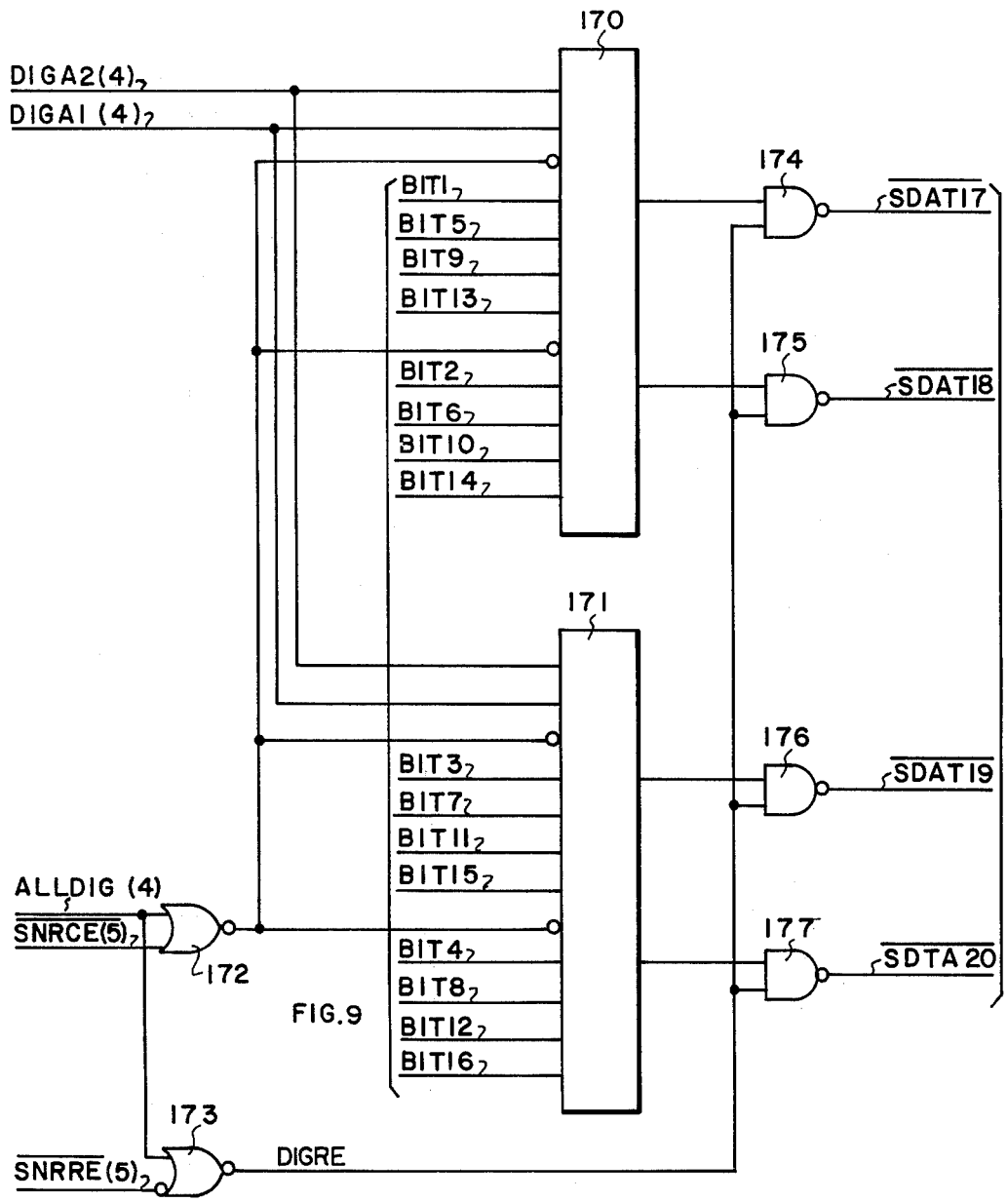
FIG. 11 shows the sender store read control of the common control.

FIG. 11 shows the sender store read control composed of 7400 logic including multiplexers 170 and 171 which are 74153 dual 4 line to 1 line data selector/multiplexers, gates 172 and 173 which are 7402 two input NOR gates, and gates 174–177 which are 7438 two input NAND buffer gates with open collectors. As was mentioned previously, reading a single digit is only useful in System S2 in the common sender store application. Multiplexers 170 and 171 are used to steer the output from any of the four bytes out of the sender common store to leads $\overline{SDAT17}$-$\overline{SDAT20}$ so that information stored can be retrieved in the same single digit bit positions. Signals ALLDIG and $\overline{SNRCE}$ are gated through gate 172 to produce signal STR which is inverted to produce low signal $\overline{STR}$ (strobe) to the multiplexers. This is because all digits are not requested, but the sender enable signal is true low. Signals DIGA2 and DIGA1 select one of the four sets of inputs (one digit) in binary fashion in the same manner as described earlier. Signals ALLDIG and $\overline{SNRRE}$ gated through gate 173 produce signal DIGRE (digit read enable) to gate the single byte data onto data leads $\overline{SDAT17}$-$\overline{SDAT20}$ through gates 174–177.

Figure 12A:
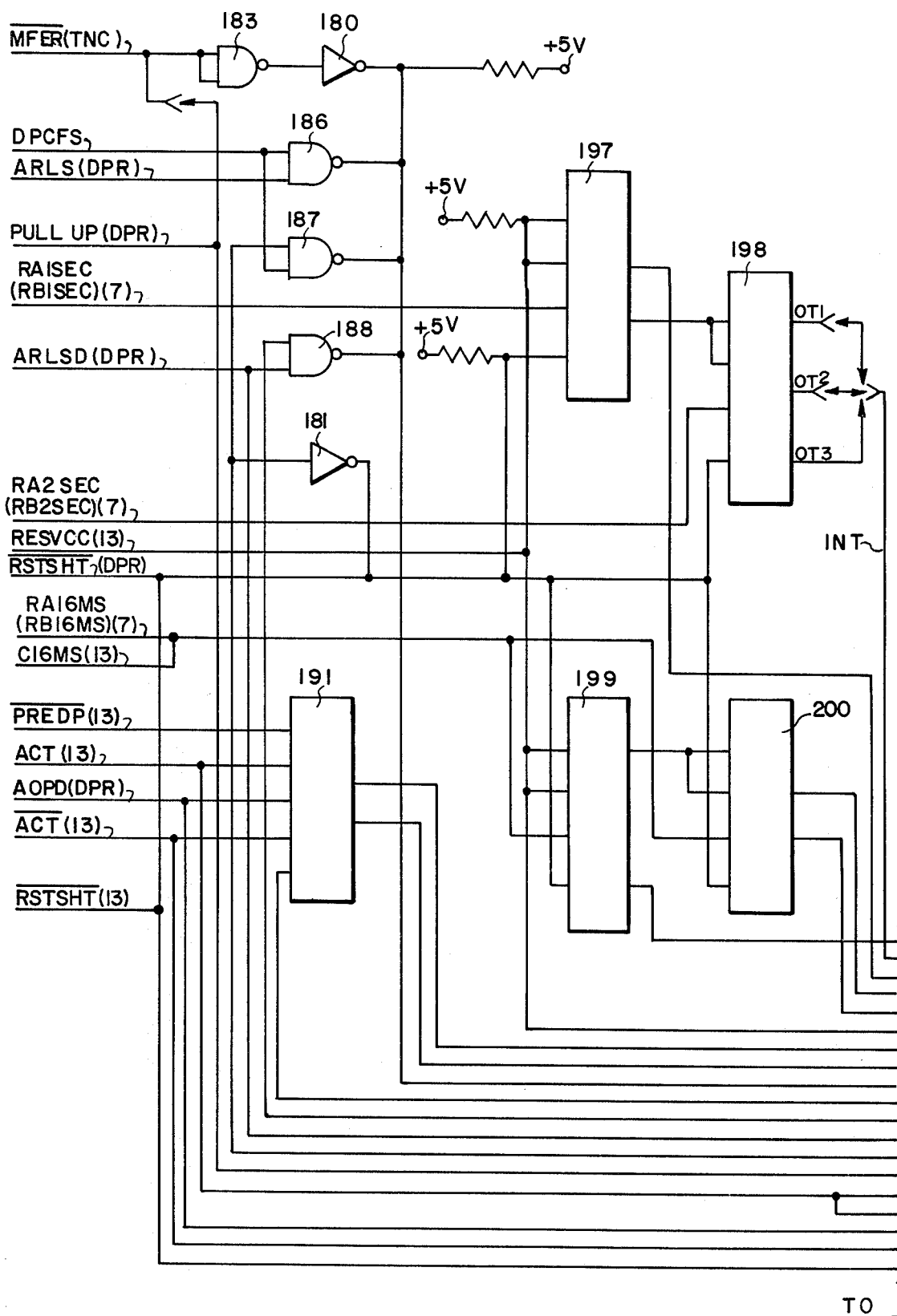
FIGS. 12 (12A and 12B) and 13 (13A and 13B) show the register control for a DP and MF or TCMF register.
Figure 12B:
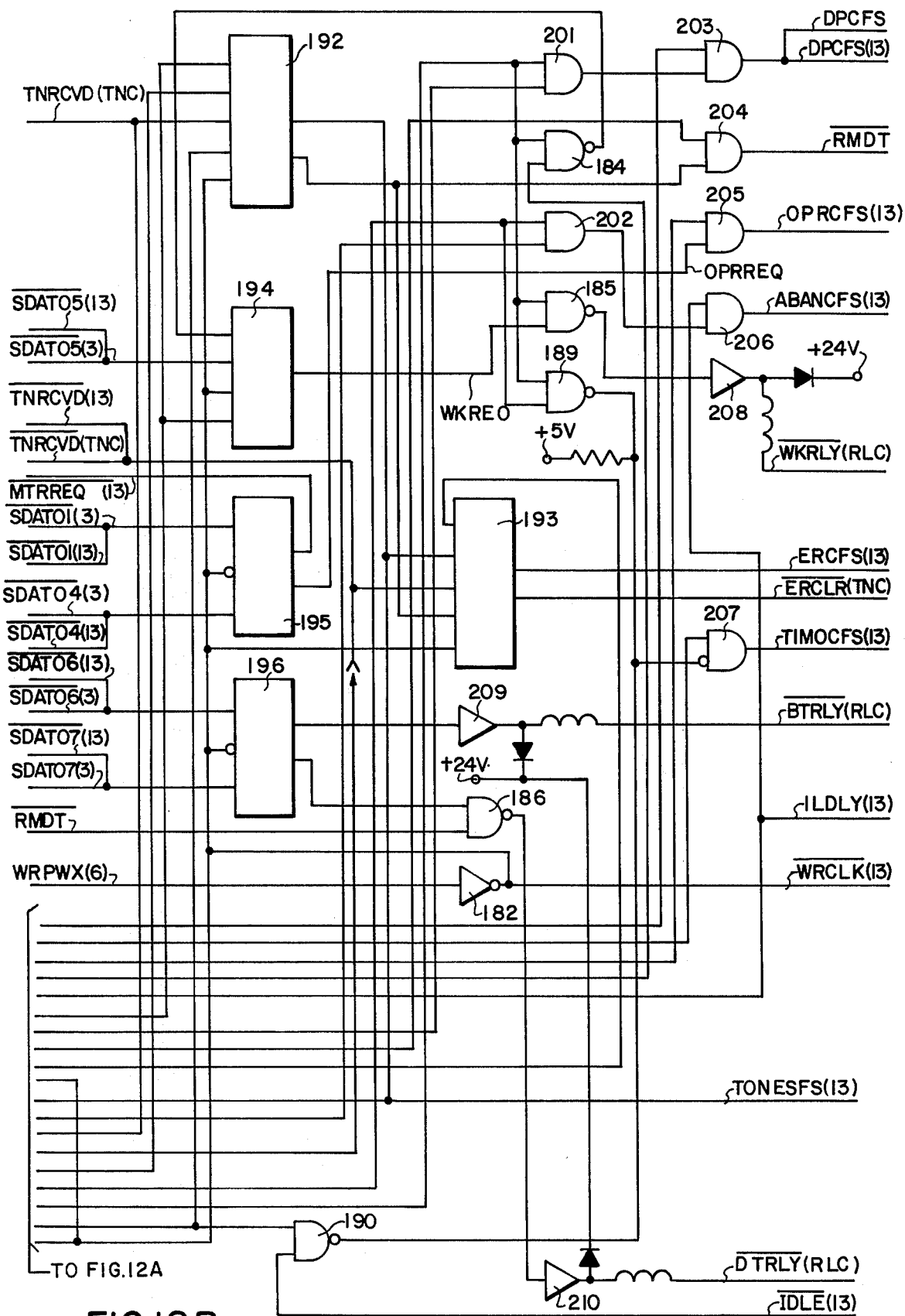

FIG. 12 shows part of the register control circuit which controls some of the register functions as it receives and transmits dialed or keyed digits from the subscribers to the central processor. The circuit is composed of 7400 commercial logic including inverters 180 and 181 which are 7405 hex inverters with open collectors, inverter 182 which is a 7404 hex inverter, gates 183–185 which are 7400 two input NAND gates, gates 186–190 which are 7401 two input NAND gates with open collectors, flip-flops 191–193 which are 7476 dual JK flip-flops, flip-flop 194 which is a 7474 dual D flip-flop, latches 195 and 196 which are 7475 dual two bit latches, shift registers 197–200 which are 74164 eight bit shift registers, gates 201–207 which are 7408 two input AND gates, and buffers 208–210 which are 7404 hexbuffers. Control data from the registers is transmitted to and received from the central processor in the form of 20 bit progress words as shown in Table 11. There is one progress word configuration for the processor writing into the register and one for reading from the register.

Table 11

| Write into Register | Register Progress Words BIT No. | Read from Register |
|---|---|---|
| Master CFS Request | 1 | Master CFS |
|  | 2 | DP CFS |
| Retain Counter Information | 3 | Tone CFS |
| Operator CFS Request | 4 | Operator CFS |
| Wink Start Request | 5 | Timed Out CFS |
| Busy Tone Request | 6 | Abandon CFS |
| Dial Tone Request | 7 | Error CFS |
|  | 8 | Side of Line |
| Pulse Bypass Request | 9 | Pulse Bypass |
| Idle | 10 | Idle |
| Activate | 11 | Activate |
| Busy Out | 12 | Busy Out |
| Tally Store (8) | 13 | Tally Store (8) |
| Tally Store (4) | 14 | Tally Store (4) |
| Tally Store (2) | 15 | Tally Store (2) |
| Tally Store (1) | 16 | Tally Store (1) |
|  | 17 | Digit Counter Store (8) |
|  | 18 | Digit Counter Store (4) |
|  | 19 | Digit Counter Store (2) |
|  | 20 | Digit Counter Store (1) |

The four shift registers 197–200 are used to generate the timing required for abandon call (224–240 milliseconds), interdigital pause (94–112 milliseconds), time out (8, 12, 16, or 24 seconds), wink start (208–224 milliseconds), and operator time out (3 to 4 seconds). The shift rate is controlled by the clock pulses from the common card shown as signals RA1SEC, RA2SEC, RA16MS (1 second, 2 seconds, and 16 milliseconds respectively). The progress word bits received by this circuit from the central processor are $\overline{SDAT01}$, $\overline{SDAT04}$, $\overline{SDAT05}$, $\overline{SDAT06}$, and $\overline{SDAT07}$. Respectively these represent the commands master CFS request, operator CFS request, wink start request, busy tone request, and dial tone request.

Figure 13A:
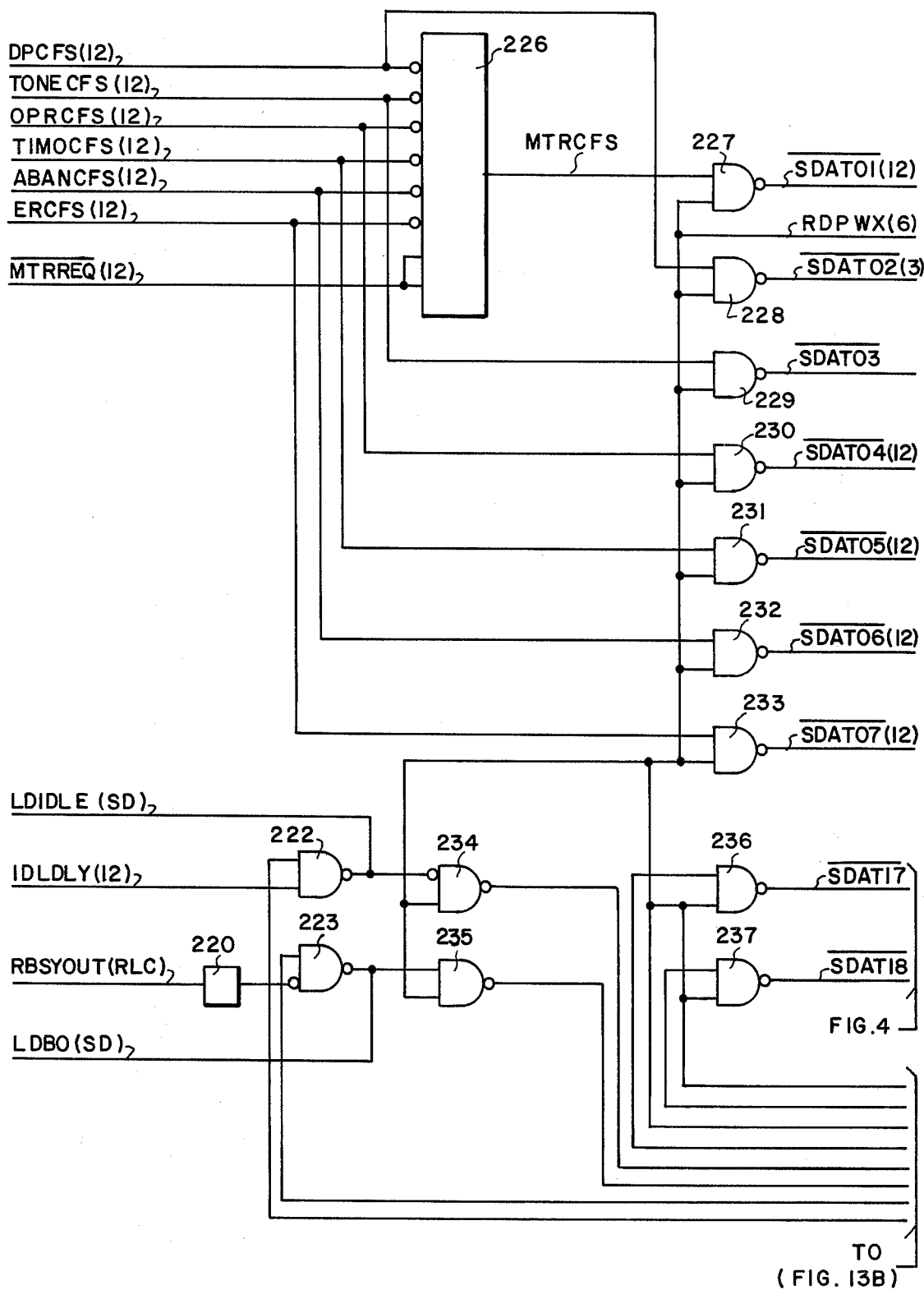
Figure 13B:
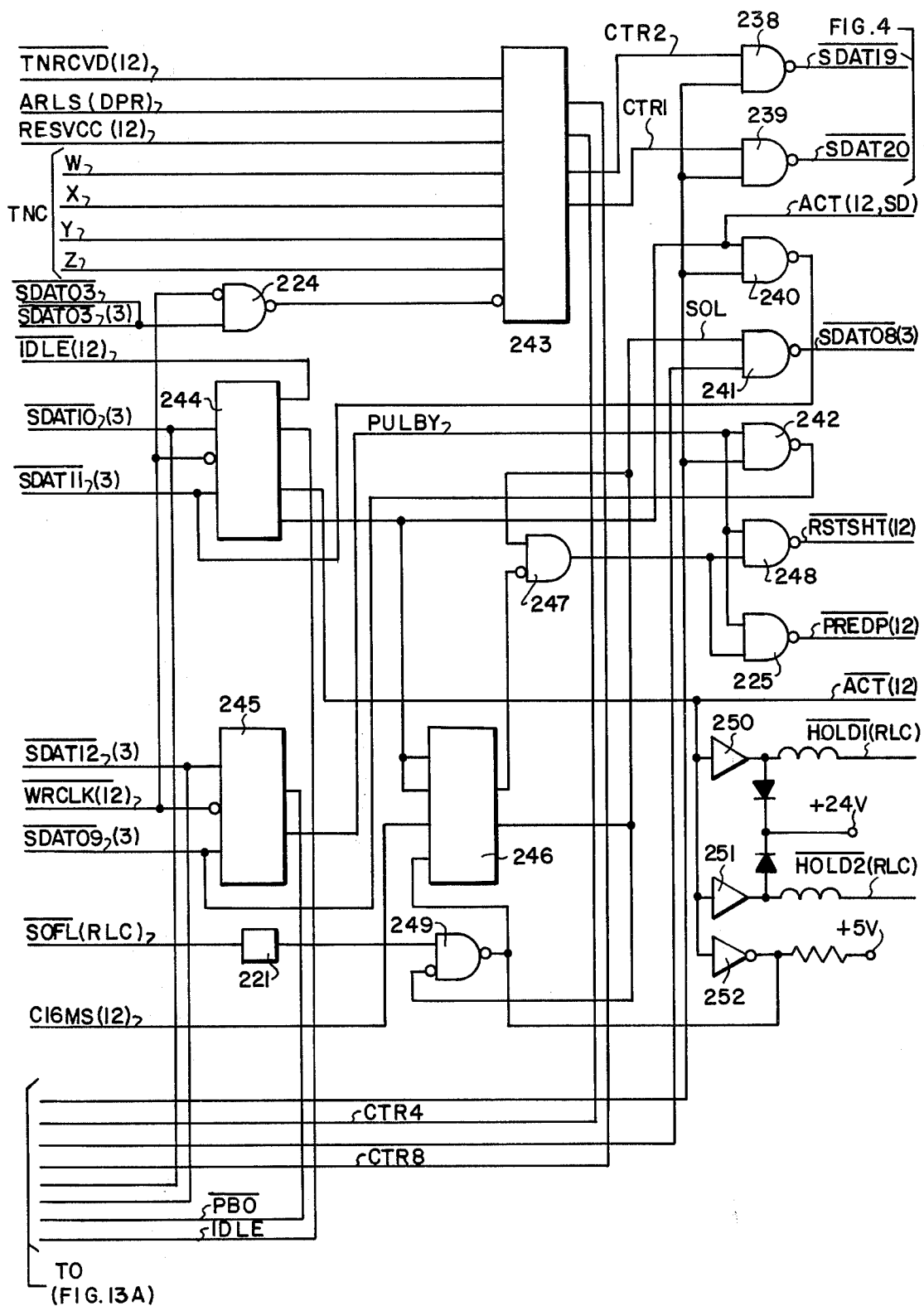

FIG. 13 shows the rest of the register control comprising filters 220 and 221, gates 222–225 which are 7400 two input NAND gates, gate 226 which is a 7430 eight input NAND gate, gates 227–242 which are 7438 two input NAND buffer gates with open collectors, counter 243 which is a 7493 four bit binary counter, latches 244 and 245 which are 7475 dual two bit latches, shift register 246 which is a 74164 eight bit shift register, gate 247 which is a 7408 two input AND gate, gates 248 and 249 which are 7401 two input NAND gates with open collectors, buffers 250 and 251 which are 7407 hex buffers, and converter 252 which is a 7404 hex inverter. Filters 220 and 221 are merely electromechanical to electronic interfaces of our design. This circuit accepts calls for service in the control section of FIG. 12 and routes them to output gtes 227–233. These feed leads $\overline{SDAT01}$-$\overline{SDAT07}$ respectively, going to the bus via FIG. 12 and the common control (FIG. 3). Three signals produced in this circuit are also used to indicate the status of the register. These signals LDIDLE, LDBO, and ACT are sent to a status display (SD) which indicates the various possible status of the register as shown in the following Table 12.

Table 12

| State | Description | Idle Bit (LDIDLE) | Activate Bit (ACT) | Busy-Out Bit (LDBO) |
|---|---|---|---|---|
| Idle | Available for use. | 1 | 0 | 0 |
| Reserved | Busy; no connections have yet been established in the network. | 0 | 0 | 0 |
| Activated | Busy; connection is established in the network. | 0 | 1 | 0 |
| Idle & Busied-Out | Not available for use due to having been busied-out. | 1 | 0 | 1 |
| Activated & Busied-Out | Busy; connection established. This is not a normal state and could indicate a faulty logic card. | 0 | 1 | 1 |
| Reserved & Busied-Out | Busy; no connection. This also is not a normal state and could indicate a faulty logic card. | 0 | 0 | 1 |
| Illegal States | Faulty logic card. | 1 | 1 | 0 |
|  |  | 1 | 1 | 1 |

A "1" indicates that the LED is on.

This circuit enables the various status indications to be given for the registers which could be, but would not have to be, a status display system.

The operation of the two controls circuits is as follows. Latches 195 and 196 and flip-flop 194 on FIG. 12 and latches 244, 245, and gate 224 on FIG. 13 make up the processor input to the register. In these latches and flip-flops are stored the commands which the processor gives to the register during the processing of a call. On FIG. 13, gates 227-239 make up the total register output to the processor. Both the register inputs and outputs are true low and form a major portion of the register progress word with the remaining 4 bits being stored in the tally in the common memory as mentioned above. In order to place instructions of the type shown in Table 11 into the register, the processor must first drive the appropriate input signal to the true state (low) via the bus and lead WRPWX, which is used as the clock and is driven to a 1 and then back to 0. When obtaining information from the register, lead RDPWX (FIG. 13) is driven to a 1 during the recycle. This causes any 1 present on the other input of the gates 227-242 to be placed on the bus as a 0.

The register is designed to receive DP and TCMF or MF tones. This means that if desired, the register can be used for the following functions:
 a. DP only;
 b. DP and TCMF only; and
 c. DP and MF only.

When the register is assigned to receive TCMF or MF it must do so in conjunction with the tone control circuit (TNC) which first decodes the tones received into binary code and secondly generates control signals for clocking this binary code into counter 243 (via leads W, X, Y, Z, TNRCVD and $\overline{\text{TNRCVD}}$).

The timing shift registers 197-200 mentioned above are reset with the operating or releasing of the BFD (battery feed device) with the processor having serviced the register or the tones having been received. This allows all timing to be generated from the same shift registers. Inverter 181 resets the shift register when tones are received; signal WRPWX through inverter 182 resets them when the processor writes into the register; and signal $\overline{\text{RSTSHT}}$ from the dial pulse receiver (DPR) resets the register when a change of state of the BFD occurs. Shift registers 199 and 200 are connected in series in order to obtain a 16 bit shift register. They use a 16 millisecond clock pulse which allows timing to be performed up to 240-256 milliseconds. Shift registers 197 and 198 are also connected as a 16 bit shift register; however, register 197 uses a 1 second clock pulse while register 198 uses a 2 second clock pulse. Depending on the length of the time out (TO) timer required, leads OT3, OT2, or OT1 are strapped to lead INT to obtain one of the following available time out intervals: 8 seconds, 16 seconds, or 24 seconds (respectively).

The operation of the register control will now be discussed in conjunction with the following commands.

1. DIAL PULSE CFS

Flip-flop 191 (FIG. 12) is used to control the dial pulse CFS generated after reception of each digit. In order that the register produce a DP CFS, it must first be activated by the processor (activated state, signal ACT = 1 and signal $\overline{\text{ACT}}$ = 0). This primes the J and K inputs to flip-flop 191 to the set state. The clock input to this flip-flop is lead AOPD which is simply an indication of the state of the BFD. If operated, signal AOPD will be at a 1, and if released it will be at a 0. Since this type of flip-flop sets on the 1 to 0 transition (or trailing edge) the BFD must first operate and then release in order to set this flip-flop. Presumably, this would be the start of a dial pulse. Gates 201 and 203 are used as a three input AND gate which will go to a 1 when flip-flop 191 is set, signal AOPD is at a 1 (BFD operated), and when the output of shift register 199 to gate 203 goes to a 1. This will occur only after a time delay of 100 milliseconds since the last change of state of the BFD. Gate 203 going to a 1 causes a DP call for service (DPCFS) to the processor via gate 228 (FIG. 13).

2. TONE CFS

Gate 192 is used to produce a tone CFS by causing one input of gate 229 to go high. Signals TNRCVD and $\overline{\text{TNRCVD}}$ are complementary signals which go to their respective true states for approximately two milliseconds, only when a binary digit is to be loaded into counter 243 (FIG. 13) due to tones having been received by the tone control circuit associated with this register. When signal TNRCVD returns to a 0, flip-flop 192 sets and causes a tone CFS. Similar to signal DPCFS the register must be in the activated state for this to occur due to the appropriate connection of its J and K inputs to signals ACT and $\overline{\text{ACT}}$.

3. THREE TO FIVE SECOND CFS

When the processor desires an operator time out (3 to 5 seconds) the $\overline{\text{SDATO4}}$ lead is driven true via the bus and a WRPWX signal is generated. This causes the output of latch 195 to gate 205 to reset which places a 1 on that input to gate 205. If the shift registers are not reset by any of the three means previously mentioned for approximately 3 to 5 seconds, then the output of shift register 197 to gate 205 will go to a 1 and cause gate 205 to produce a 1 also. This places a 1 (signal OPRCFS) to gate 230 and if the processor interrogates this register via lead RDPWX, then lead OPRCFS will be true. Had a digit been received, shift register 197 would have been reset and a DPCFS or tone CFS signal produced. Thus the processor would have approximately 3 seconds to see this CFS before the time out would have time to elapse again. Even if the time out was allowed to elapse, this condition could be detected by the fact that a digit CFS is also present.

4. TIME OUT CFS

The register time out circuitry is made up of gates 189 and 190, gate 207, shift registers 197 and 198, and gate 231 (FIG. 13). In the reverse state (signals $\overline{\text{IDLE}}$ = 1 and $\overline{\text{ACT}}$ = 1), gate 190 outputs a 0 which is inverted to 1 at the input of gate 207. The other input to gate 207 from shift register 198 will go to a 1 only if the shift registers have not been reset for the alloted time interval. If this 8, 16, or 24 second time out (as strapped) elapses without any communication from the processor to the register then gate 207 will output a 1 and thus a time out CFS (TIMOCFS) will be produced. When the register has been activated (signal ACT = 1) and when the BFD is operated, gate 189 will output a 0 and a similar sequence is initiated. However, since the connection has in this case, been established to the subscriber, there must be no communication from a subscriber to the register or from the processor to the register for the alloted time interval in order for this time out to occur.

5. ABANDON CFS

The abandon circitry is made up of gates 202 and 206, shift registers 199 and 200, and gate 232 (FIG. 13). When the register is activated (signal ACT = 1), the BFD is released (signal ARLSD = 1), and when the output of shift register 200 to gate 206 has set due to an elapsed time interval of approximately 230 milliseconds, gate 206 will output a 1 (signal ABANCFS = 1). Since the other input to gate 232 is high, when the processor reads the contents of the PW, lead $\overline{SDATO6}$ will be low indicating an abandoned register.

6. ERROR CFS

An error CFS is produced when a digit has been lost or when the associated MF receiver signals three or more tones present on the line (only two are allowed). Flip-flop 193 is used to store the error condition when it occurs. A digit is lost when a DP or tone CFS is present and a new digit is received. Since the CFS is still present, the processor has obviously not answered this CFS and thus has not seen this digit. When a tone CFS is present flip-flop 192 is set and this places a 1 on the J input to flip-flop 193 and a 0 on the K input. Should the signal $\overline{TNRCVD}$ go low (tones present) then flip-flop 193 will set and cause signal ERCFS to go high at the input to gate 233 (FIG. 13). Thus an error CFS is produced ($\overline{SDAT}$ is low when RDPWX goes true). Other, less likely, combinations of CFS present and a digit being received will also produce an error CFS. Gate 188 will preset flip-flop 193 when a tone CFS is present and the BFD releases (start of a DP digit), Gate 186 will also preset flip-flop 193 if signal DPCFS is present and the BFD releases (signal ARLS). This preset pulse will be very short due to the fact that the DPCFS is removed when the BFD releases. However, gate delay should be sufficient to insure an error CFS. (The unlikelihood of this ever happening does not warrant any further hardware). Gate 187 will also produce a short reset pulse if signal DPCFS is present and tones are received. Here again gate delays are used due to the unlikelihood of this event occurring in a working system. Should an error signal be received from the tone control circuit, lead $\overline{MFER}$ will cause gate 183 to go high, causing inverter 180 to go low and preset flip-flop 193. Lead $\overline{ERCLR}$ is returned to the tone control circuit as an indication that the error has in fact been recorded by the register.

7. MASTER CFS

Each of the above CFS conditions are reset, each and every time the processor writes into the register, due to their CLEAR inputs being connected to lead WRPWX inverted through inverter 182. In order to allow a more sane scan cycle, a master CFS bit was incorporated into the register PW. Each of the CFS's previously explained are inverted at the inputs to gate 226 whose output is coupled to gate 227. Each of these CFS's will cause lead $\overline{SDATO1}$ to go true (0). Furthermore, a master CFS can be set in the register by the processor with the use of latch 195. By causing lead $\overline{MTRREQ}$ to go true via latch 195 and producing a WRPWX pulse, latch 195 will reset and cause gate 226 to go high, thus producing a master CFS (signal MTRCFS).

8. DIAL TONE

When initially connected to the subscriber, the register can supply a dial tone if so instructed by the processor. Lead $\overline{SDATO7}$ is used by the processor to set latch 196. The output of latch 196 to gate 186 goes to a 1. Lead $\overline{RMDT}$ (remove dial tone) will also be high if flip-flops 191 and 192 are both in the reset state. Therefore, gate 186 will output a 0 and cause buffer 210 to drive a ground on lead $\overline{DTRLY}$. The dial tone relay in the register line circuit (RLC) will operate and supply dial tone to the subscriber. At the beginning of the first dial pulse flip-flop 191 sets and upon the reception of tones flip-flop 192 sets, either of these two conditions will cause lead $\overline{RMDT}$ to go low. In doing so, it will cause buffer 210 to remove the ground on the $\overline{DTRLY}$ lead and thus the dial tone relay will release.

9. BUSY TONE

When the register is instructed to supply a busy tone, latch 196 will be reset via lead $\overline{SDATO6}$. This will output signal $\overline{BT}$ to buffer 209 which will cause lead $\overline{BTRLY}$ to go to ground and cause the BT relay to operate. To remove this signal the busy tone of latch 196 must be set.

10. WINK START

Flip-flop 194 is the wink start request flip-flop. When reset by the processor it instructs the register to return a wink start upon seizure. This is done via gate 185 which goes to a 0 when flip-flop 194 is reset, and when lead AOPD goes high (register is seized, BFD operated). This causes buffer 208 to ground lead $\overline{WKRLY}$ which operates the wink relay in the associated RLC. Gate 184 will go low (0) when the BFD is operated (signal AOPD = 1) and when its output from shift register 200 has set. This output will set only after a time delay of approximately 215 milliseconds after the BFD is operated. The 0 produced by gate 184 is used to preset flip-flop 194 and thus gate 185 goes back to a 1 when the wink relay is released.

11. IDLE BIT

When the processor wishes to seize the register, lead $\overline{SADT10}$ is driven high (not true) and a WRPWX signal is produced. This sets the output IDLE from latch 244 (FIG. 13) and thus marks the register as busy. It does so via gate 222 which produces a high output which is inverted at gate 234. ($\overline{SDAT10}$ = 1 when the register contents are read). When the processor wishes to change the status of the register from busy to idle it does so by resetting latch 244. This puts a high on its input to gate 222; however the second input to gate 222 will not go to a 1 until signal IDLDLY is produced by the setting of shift register 200 after 230 milliseconds from the last change of state of the BFD. If the register was activated initially, 230 milliseconds plus 15 milliseconds (time for the BVD to release) would be the time required for signal IDLDLY to go high and thus the register goes idle. If the register were in the reverse state (not activated), the time delay would only be approximately 230 milliseconds. When signal IDLDLY goes to a 1 on its input of gate 222 the output will cause signal LDIDLE, thus marking the register as idle.

12. ACTIVATE

Latch 244 stores the activate command. When set, its output to gate 240 will cause gate 240 to relay to the processor an unactivated register. When reset, however, it will activate much of the register logic via signals ACT and $\overline{ACT}$ and in addition it will cause the B and BB relays in the RLC to operate via leads $\overline{HOLD1}$ and $\overline{HOLD2}$ (buffers 250 and 251).

13. BUSY-OUT

The register may be busied out by the processor or by a switch located in the RLC. The latch 245 provides the processor with the capability. When reset it places a 0 on its input to gate 223 and gate 223 will produce a 1 which marks the register busied out via gate 235. Should the switch in the associated RLC be operated or should the RLC circuit itself be removed, an open circuit is presented to the filter 220 which in turn is inverted to gate 223 to drive a 0 into its input of gate 223. The result produced is then the same, a busied out register.

14. PULSE BYPASS

The second output of latch 245 is reset only when a pulse bypass is required on a particular call. This output PULBY causes gate 242 to relay the state of the pulse bypass bit to the processor. Also, it causes its input to gates 248 and 225 to go to a 1. The second input to these gates is taken from gate 247 which goes to a 1 for approximately 16 milliseconds when the side of line is detected. In doing so, signal $\overline{RSTSHT}$ and $\overline{PREDP}$ go to a 0 for the same duration and cause the shift registers to be reset and flip-flop 191 (FIG. 12) to be preset to a 1. The shift registers are reset in order to insure that the interdigital timing begins from 0. Flip-flop 191 is preset in order to allow a DPCFS to be produced at the end of this interdigital timing if the first digit dialed is a 1, (the first pulse is always absorbed in the pulse bypass trunk adapter.

15. SIDE OF LINE

The side of line signal presented to the register from the RLC is a minus potential on lead $\overline{SOFL}$. It is filtered through filter 221 and forwarded to one input of gate 249. The clear input of shift register 246 is allowed to go high only if the register is activated due to inverter 252. If activated, register 246 will be allowed to shift 1's. When the output SOL from register 246 goes to a 1, it is inverted at gate 249 to maintain a 0 on that input of gate 249 to lock the shift register. Gate 247 is allowed to go to a 1 due to its first input from register 246 being set and its second input being inverted after being reset. However, the second input sets 16 milliseconds after the first one and thus gate 247 will remain at a 1 for approximately 16 milliseconds.

16. DIAL PULSE COUNTER

Counter 243 is used to count the dial pulses due to lead ARLS being connected to its up input. It is also used to store four bit binary digits loaded in parallel from the tone control card by signals W, X, Y, Z, and $\overline{TNRCVD}$. Furthermore, due to gate 224 which is inverted at counter 243, the processor may or may not reset the counter each time it writes into the register by driving lead $\overline{SDATO3}$ high or low when producing the WRITE pulse. When reading from the register, gates 236–239 provide the processor with the contents of the counter.

FIG. 14 shows the overall timing diagram for the RSC module. The timing chart is shown in milliseconds with the corresponding output from the monostables, counters, and inverters described in FIG. 7. The uses of the particular timing pulses are also shown.

Having described the operation of the common control and the register control (particularly detailed in this application), the description will not be given of the overall system operation with the particular requirements of each register, sender, tone control circuit, dial pulse receiver, and status display given. Examples of particular ones of these devices which could be utilized in the system will also be identified.

In a system (as shown on FIG. 1 and FIG. 2) the registers and senders and common control are provided in register and sender control (RSC) modules connected to the bus through the BIU. Typically in a system at least two RSC modules will be provided for reliability. A fully equipped System S2 would contain a maximum of 44 registers and 20 senders mounted in eleven RSC modules. Ten modules are equipped with four registers and two senders while the remaining module is equipped with only four registers. The central processor in conjunction with the common control of the RSC module governs the sending and receiving of data concerned with call processing. A particular module will only contain tone control circuits if a register is equipped for TCMF or MF receiving. The common control contains common stores for all corresponding registers and senders in the module, addressing control for input and output of all digits to and from the registers and senders, and common clocks used to supply the various timing pulses for all the circuits within the module. The common control contains an address buffer to determine which register or sender store location to access for input or output of digits. It also contains a tally store and a sender store read control. The tally store is used as a digit count store as well as a program flag store.

The common control of the RSC is under control of all bus signals as they come only to the common control where the address is stored and decoded. If for instance, the common memory is accessed, all operations will take place in the common control. If a progress word is addressed, the common control determines whether it is a read or write progress word and activates a select for the particular register or sender and its progress word. If the common memory is addressed the leads $\overline{RWEDG0}$ to $\overline{SWEDG3}$ (FIG. 5) control the writing and reading. If a read or write progress word is used the respective RDPW and WRPW leads (FIG. 6) are used. Part of the progress word is the tally store, physically located in the common control which is controlled through the signal TALYRE (FIG. 6) and automatically superimposed in its correct bit positions in the progress word (bits 13, 14, 15, and 16).

The common control is coupled to each of the other units by an internal module bus structure. By providing the internal bus structure, the progress word, the common storage, clocks, and address decoding; a balance between economics, reliability, flexibility, and ease of expansion is provided. Because the progress word is just a memory location, the central processor can use the bus for commands. By changing these commands they can be made to control any kind of register or sender without modification to the common control. This has in fact been done in this system using a mixture of different types of registers and senders in the same module. Further, since the progress word is 20 bits wide, the common is linearly decoded and does not require decoding in a register or a sender. Also by using bus commands as part of the progress word's address, two locations are actually created from one memory location. That is a "WRITE" PW and a "READ" PW. This allows more used to be made of the PW since some bits are commands only (write PW) and are never read back. As pointed out above signals $\overline{DTIN}$ and $\overline{DTOT}$ decide whether it is the read progress word or the write progress word. These same bits have different uses as also described above.

In general, devices in the System S2 are accessed on a two-cycle basis. In an address cycle, the common control of the module selected by the page plus module digits (bits 1 to 8), decodes the address field applied to the module. This addressing is shown in the following table.

Table 13

| | | RSC MODULE ADDRESSING TO DATA BUS VIA BIU | | |
|---|---|---|---|---|
| 1 2 3 4 | 5 6 7 8 | 9 10 11 12 | 13 14 15 16 | 17 18 19 20 |
| SELECTS REG. SENDER SUBSYSTEMS | SELECTS 1 OUT OF 11 MODULES | SELECTS PARTICULAR REGISTER OR SENDER | SELECTS PARTICULAR 16 BIT STORE | SELECTS PARTICULAR 4 BITS OF 16 BIT STORE |

Because of the fact that all modules are identical in address structure, only the first two addressed digits change. All other addressing is identical for each module which allows greater simplification in the commands used, because the same store addresses can be used regardless of which register is actually being accessed. Only the particular bus module digits will change. Once decoded, the memory location or PW selected is ready to receive data or to be read out of on the next cycle. No distinction is made between memory and PW's. It should also be noted that the ANI stores are now provided as part of the sender store in the common control. The store previously (in System S1) had to be associated by the commands with the particular sender, however, the centralization of memory of the four registers and two senders in the common control makes the hardware association in the common control economical and further simplifies the commands. Because the memory and addressing are preassigned, registers and senders within a module can be added by plugging into the module. When a module is full, another module is easily added to the system.

Registers are provided to receive and store incoming digits from lines and trunks. The registers can be basic dial pulse (DP) registers which receive their input from the RLC through a dial pulse receiver. The dial pulse receiver is used to convert the dial pulses into logic signals for use in the register control logic and to reject any short pulses which might otherwise cause the register to receive faulty digits. Details of a particular dial pulse receiver which may be utilized with the register and sender module is shown in a co-pending application, to a Dial Pulse Receiver, by Gauthier, Ser. No. 510,080, filed the same day as this application, now U.S. Pat. No. 3,941,937.

The registers can be modified to receive TCMF or MF tones via the MF or TCMF receivers. The registers provide dial tone, re-order tone as required, detect no dial from abandoned calls, and a side of line condition. The side of line condition is sent to the register via control signal $\overline{SOFL}$ on FIG. 13 as more fully described in co-pending application to Shaver et al, to an Electronic Side of Line Detector, Ser. No. 510,082, filed the same day as this applicaion, now U.S. Pat. No. 3,939,308. This signal is used to indicate which party on a two party line is connected to the register. A particular register may be modified by strapping to provide either a DP or TCMF signal, or a DP and MF signal. However, the same register cannot be strapped to receive both TCMF and MF signals. A particular register control unit was described in FIGS. 12 and 13.

The sender control circuits are provided to control outpulsing dialed digits in either DP or MF signals to a distant office. In certain instances both modes of sending may be utilized such as when a number of prefix digits are sent in DP (usually not more than three) and the rest of the number in MF. The major sections of the sender circuitry consists of a progress word control, sender stores, an outpulsing control, a DP and MF pulse generator, and MF converter, a loop status monitor, and a line control circuit.

Once it is selected a register or sender receivers all commands from the central processor. In general, a register is assigned to a call by the central processor and connected through its RLC, through the network to the subscriber trunk. Either tones or pulse trains are then received. By internal timing the register determines when a complete digit has been received and sets a call for service (CFS) bit in its PW. The next time this register is scanned the central processor sees the CFS, takes the signal digit, determines from the tally which digit it is (first, second, third, etc.), and stores it in the proper location in the register common store. Translation is possible after any digit, in contrast to crossbar registers which distribute the digits into relay storage one at a time using hardware logic. Their common control does not see each digit until a number has been received. This is especially awkward with new dialing patterns such as 00+ for international calls.

Similarly, a sender is assigned to a call by the central processor. A single digit is taken from the sender common store and placed in the progress word bits 17 to 20 for sending. When sent, the sender will call for service and the next digit is loaded.

In addition to the above, the register through its RLC and the sender through its SLC monitor the loop or transmission facility for DC control signals. These signals are then carried to the progress word where they are then detected by the central processor.

All time outs in the register and sender circuits use the clock pulses from the common control as shown in FIG. 14. This allows timing cages in the register and sender circuits by only changing the strapping and not by adding any additional components or circuits.

Tone control circuits are provided when multifrequency tones are to be received by any register in the module. One tone control circuit will provide decoding and control necessary for two registers. Each register may be provided with a tone control circuit to decode TCMF or MF tones, however, in a particular tone control circuit provided with System S2 the decoding is provided in a common section which is then time shared between the two registers. The registers for this tone control circuit may be assigned both to TCMF or both to MF or one to MF and one to TMCF receiving. The tone control circuits convert TCMF digital codes or MF 2/6 digital codes to a hexadecimal code. The hexadecimal code is the numbering system used throughout the System S2 as described above. Further details of a tone control circuit utilized in the system is shown in a co-pending application to Gauthier, to a Time Shared TCMF or MF Decoder, Ser. No. 510,083, filed the same day as this application, now U.S. Pat. No. 3,941,938.

During normal system operations, signals from the central processor via the bus control unit (BCU) are received by one of the two BIU's employed by each RSC modules which interface with data bus A and data bus B respectively. A brief description will be given of the transfer which takes place between the BIU and the module, however, a more detailed explanation of the BIU may be found in the above-mentioned BCU patent to Borbas. The BIU circuit having determined to respond by detecting its code on the first two bytes will relay signals to the common control of the RSC module. These signals are the above mentioned $\overline{SELCT}$, $\overline{ADCL}$, and $\overline{DTIN}$, $\overline{WRST}$, $\overline{DTOT}$, $\overline{RDST}$, and ACKC. These signals are used to allow a transfer of information to take place either from the central processor to the module (register or sender) or vice versa. The BIU provides the decoding of the first 8 bits as shown in Table 13 and selects the module by bus control signal $\overline{SELCT}$. The BIU also provides the address clock signal $\overline{ADCL}$ which clocks the address latches in the common control. Signals $\overline{DTIN}$ and $\overline{WRST}$ correspond to data in and write start and are used to select the mode whereby information will be taken from a register or sender and placed in the central processor. Signals $\overline{DTOT}$ and $\overline{RDST}$ (data out and read start respectively) indicate that information is to be stored into a register or sender.

Figure 15:
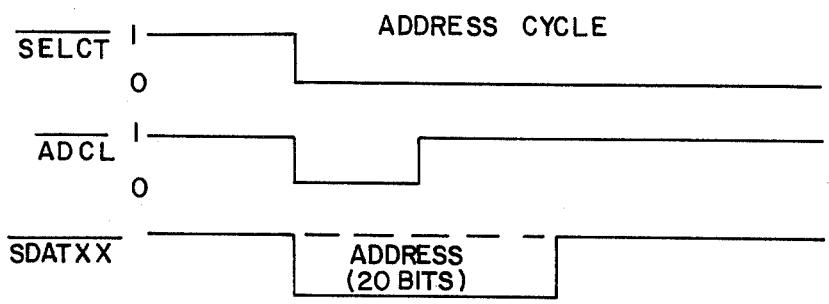
FIG. 15 shows an address cycle to the register and sender module.

FIG. 15 shows the relationship of the above signals on the address cycle of a data transfer. Signal $\overline{SELCT}$ goes true low when the BIU recognizes its code on bytes 1 and 2 of the $\overline{SDATXX}$ leads. These leads are then transferred to the common control which will then select and store the address contained therein. The common control will actually store only bytes 3, 4, and 5 (bits 9–20) from the $\overline{SDATXX}$ leads. The clocking into the common control is performed through the use of lead $\overline{ADCL}$. When this signal does from a 0 to a 1 the latches contained in the common control (FIGS. 3 and 4) then receive the specific address. After the address cycle is completed, the actual data transfer signals and the data itself are enabled.

Figure 17:
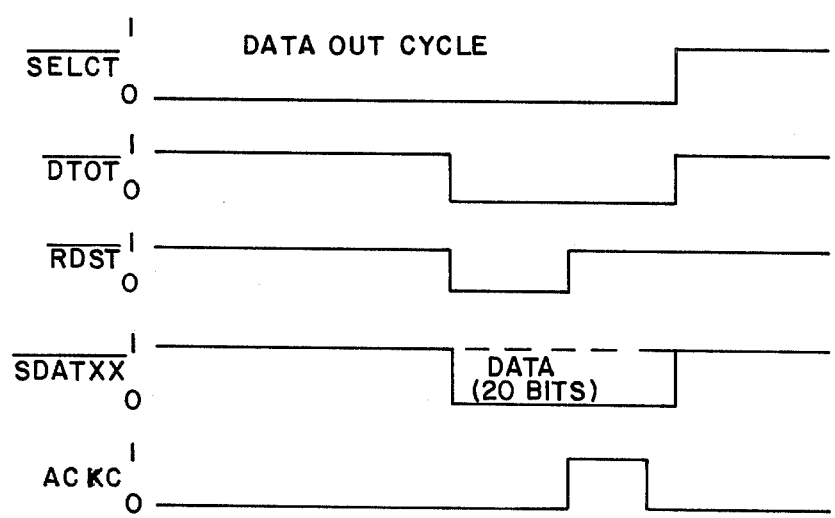
FIG. 17 shows a data out cycle for the register and sender module.

FIG. 17 shows a data transfer from the processor to the RSC module. Signals $\overline{DTOT}$ and $\overline{RDST}$ go true low. Leads $\overline{SDATXX}$ are gated with the data to be transferred. When signal $\overline{RDST}$ goes from a 0 to a 1 the data is then clocked into the appropriate register, sender, common store, or tally store depending upon the address contained in the previously mentioned common store latches. The signal ACKC is generated by the common control as an indication to the BIU that the data presented has been accepted by the module. This combination of address and data out cycle has allowed information to be transferred from the processor to any address within the RSC module.

Figure 16:
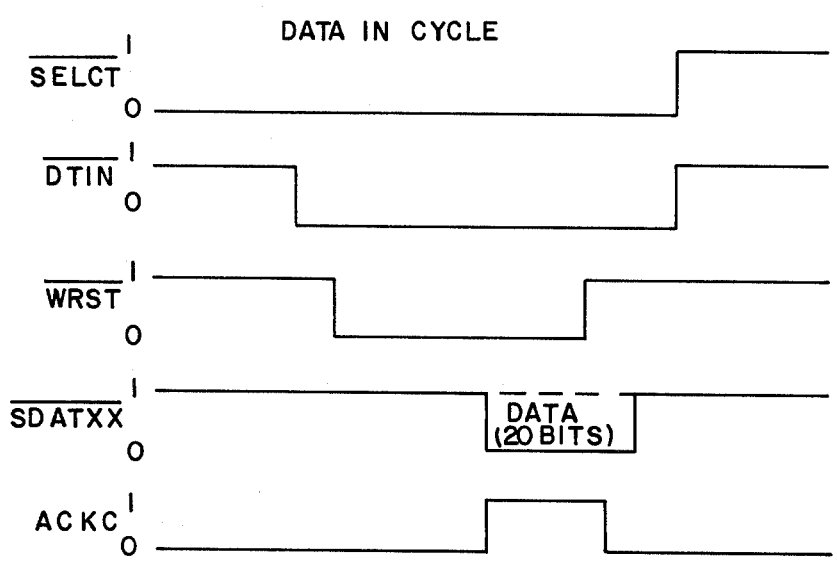
FIG. 16 shows a data in cycle for the register and sender module.

When data flow is desired from the RSC module to the processor, an identical address cycle is initiated. This time the contents of a particular store within the RSC module is to be transferred into the processor. When the address cycle has been completed the lead $\overline{DTIN}$ goes true low (0) as shown in FIG. 16. At some time later (100 ns.) lead $\overline{WRST}$ also goes true low (0). At this point the selected store within the RSC module is instructed to place its data on the $\overline{SDATXX}$ leads. When the $\overline{SDATXX}$ leads contain this data, the common control then causes lead ACKC to go true high (1). The signal ACKC then tells the BIU that the data is now present on the bus (leads $\overline{SDATXX}$). After an appropriate settling time the BIU restores signal $\overline{WRST}$ to a high (1) indicating that the data has been transferred to the processor. The signals $\overline{DTIN}$ and $\overline{SELCT}$ are both driven high and the cycle is completed.

Both an address and a data cycle are always used for any data transfer.

While principles of the invention have been illustrated above in connection with specific apparatus and applications, it is to be understood that description is made only by way of example and not as a limitation on the scope of the invention as encompassed by the following claims.

We claim:

1. An improved register and sender arrangement for a communication switching system, said system comprising a central processor, data buses connected to said central processor, bus interface units connected to said data buses for transferring control signals and data between said central processor and said register and sender arrangement via said data buses, a register line circuit and a sender line circuit, said register line circuit and said sender line circuit coupled to a switching network and to said register and sender arrangement, said improved register and sender arrangement comprising:
   register means connected to said register line circuit for receiving data from said register line circuit;
   sender means connected to said sender line circuit for transmitting data to said sender line circuit;
   common control means connected to said bus interface units and respectively to said register means and said sender means for selectively transferring data from said central processor to said register means or sender means, or selectively transferring data from said register means or sender means to said central processor, said common control means including;
   memory means for respectively storing data for said register means and said sender means, including,
      register storage means for storing data related to said register means; and
      sender storage means for storing data related to said sender means;
   decoding means responsive to said control signals for respectively address controlling the transfer of data to and from said register means and said sender means, including,
      address buffer means for selectively addressing said register storage means or said sender storage means; and
      progress word control means responsive to said control signals for selectively transferring data, respectively to or from said register means, and to or from said sender means; and clock means for timing the transfer of said data; and
   internal bus means connected to said common control mean, said register means, and said sender means for coupling said control signals and said data therebetween.

2. An improved register and sender arrangement as claimed in claim 1 wherein said sender storage means includes:
   automatic number identification storage means.

3. An improved register and sender arrangement as claimed in claim 1 wherein:
   said register means comprises at least four separate registers; and said sender means comprises at least two separate senders.

4. An improved register and sender arrangement as claimed in claim 1 wherein:
said register means includes DP register means, TCMF register means, and MF register means;
said sender means comprises DP sender means and MF sender means; and
further including tone control means connected to said internal bus means for decoding and transferring information from said register line circuits to said register means.

5. An improved register and sender arrangement as claimed in claim 1 wherein said common control means further includes:
register status display signal means for generating a signal indicating the status of said register means; and
sender status display signal means for generating a signal indicating the status of said sender means.

6. An improved register and sender arrangement as claimed in claim 1 wherein said register storage means and said sender storage means further include:
respective single digit storage means for selectively storing a single digit comprising four bits.

7. An improved register and sender arrangement as claimed in claim 6 wherein said common control means further includes:
single digit read out means coupled to said single digit storage means for selectively reading out said single digit.

8. An improved register and sender arrangement as claimed in claim 1 wherein said memory means includes:
tally and flag storage means for storing information related to a digit count corresponding to said data.

9. An improved register and sender arrangement as claimed in claim 1 further including:
tone control means connected to said internal bus means for decoding and transferring information from said register line circuits to said register means.

* * * * *